(12) United States Patent
Strong

(10) Patent No.: US 7,775,533 B2
(45) Date of Patent: Aug. 17, 2010

(54) PAYLOAD-CARRYING MOTOR VEHICLE WITH TAG AXLE HAVING DISABLEABLE BRAKES

(76) Inventor: Brooks Strong, 13617 Ralph Culver Rd., Houston, TX (US) 77086

( * ) Notice: Subject to any disclaimer, the term of this patent is extended or adjusted under 35 U.S.C. 154(b) by 289 days.

(21) Appl. No.: 12/070,040

(22) Filed: Feb. 15, 2008

(65) Prior Publication Data

US 2009/0205883 A1    Aug. 20, 2009

(51) Int. Cl.
B62D 61/10    (2006.01)
(52) U.S. Cl. .................................... 280/86.5; 180/24.02
(58) Field of Classification Search .................. 180/22, 180/24.02, 209; 280/86.5
See application file for complete search history.

(56) References Cited

U.S. PATENT DOCUMENTS

| | | | | |
|---|---|---|---|---|
| 4,063,779 | A | * | 12/1977 | Martin et al. ............. 298/22 P |
| 4,684,142 | A | * | 8/1987 | Christenson ............. 280/81.1 |
| 5,823,629 | A | | 10/1998 | Smith et al. |
| 6,116,698 | A | | 9/2000 | Smith et al. |
| 6,189,901 | B1 | * | 2/2001 | Smith et al. ............. 280/86.5 |
| 6,247,712 | B1 | | 6/2001 | Smith et al. |
| 6,371,227 | B2 | * | 4/2002 | Bartlett ............. 180/24.02 |
| 6,808,035 | B1 | | 10/2004 | Keeler |

* cited by examiner

*Primary Examiner*—Paul N Dickson
*Assistant Examiner*—Robert A Coker
(74) *Attorney, Agent, or Firm*—Ronald L. Phillips

(57) ABSTRACT

A payload-carrying motor vehicle comprises a steer axle, at least one drive axle and a tag axle. All of the axles have wheels with tires and air brakes and a tag axle suspension system is adapted to suspend the tag axle in an active condition wherein the tag axle is pivotal about a first axis parallel to the other axles and also about a second axis located equidistant from the tag axle wheels and laying in a plane at right angles to the first axis and wherein the tag axle is forced to urge the tag axle tires against a road surface to aid in supporting the vehicle. An air brake system is adapted to operate the air brakes of all the wheels and a tag axle operating system is adapted to establish the tag axle in the active condition while enabling operation of the air brakes of the tag axle wheels and to disable operation of the air brakes of the tag axle wheels when the tag axle pivots about the second axis and reaches a predetermined tilt angle in maintaining contact of the tag axle tires with a road surface.

11 Claims, 24 Drawing Sheets

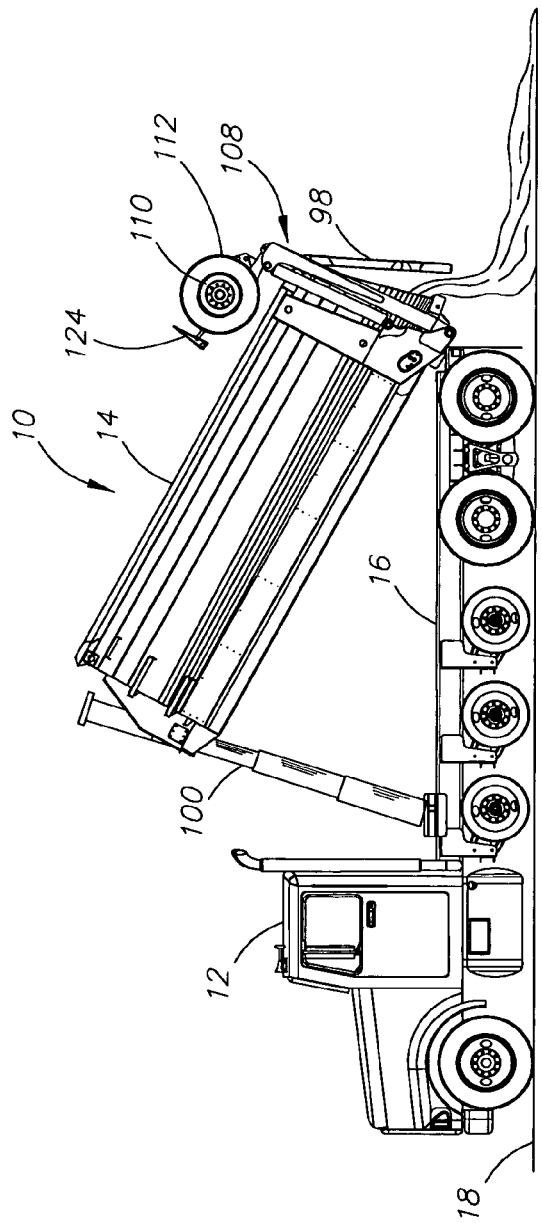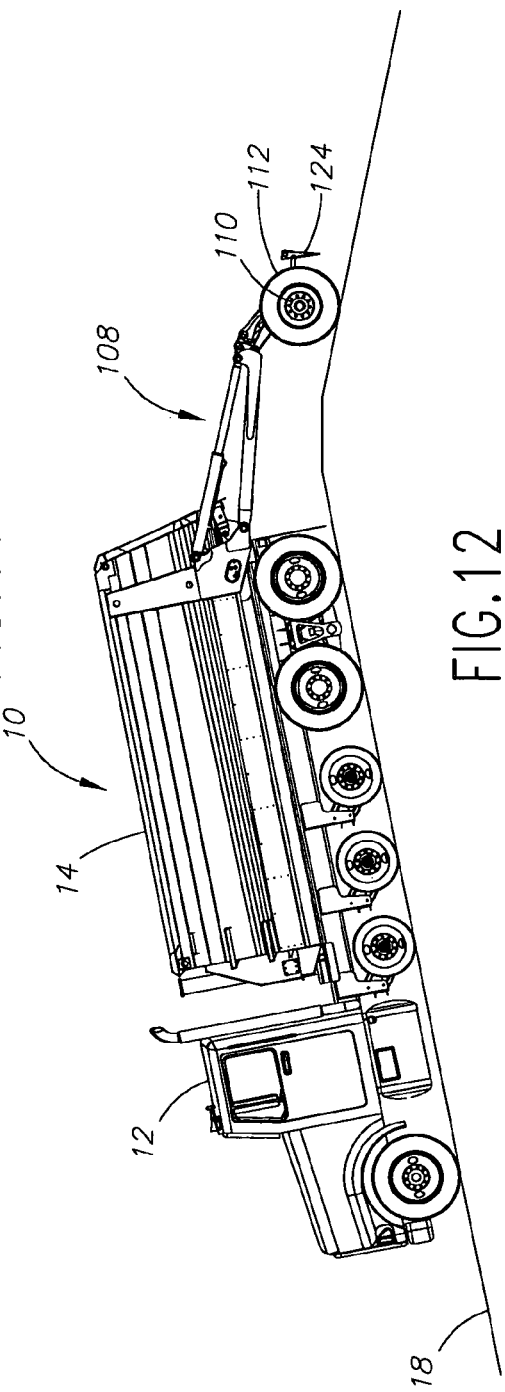

ically related components including suspension and tires. Another

PAYLOAD-CARRYING MOTOR VEHICLE WITH TAG AXLE HAVING DISABLEABLE BRAKES

TECHNICAL FIELD AND RELATED PATENT APPLICATIONS

This invention relates to payload-carrying motor vehicles having a tag axle and to the following concurrently filed U.S. patent application Ser. No. 12/070,041 entitled "PAYLOAD-CARRYING MOTOR VEHICLE WITH TAG AXLE HAVING PRIMARY AND SECONDARY SUSPENSION", application Ser. No. 12/070,049 entitled "PAYLOAD-CARRYING MOTOR VEHICLE WITH TAG AXLE HAVING FORCE RELIEVABLE SUSPENSION", and application Ser. No. 12/070,048 entitled "TAG AXLE OPERATING SYSTEM".

BACKGROUND OF THE INVENTION

Payload-carrying motor vehicles such as dump trucks are limited in their payload-carrying ability by various factors including the load capacity of their supporting axles and their related components including suspension and tires. Another limiting factor but which is quite distinct from vehicle component load limitations is government regulations. And all these factors impact on the economical use of a payload-carrying motor vehicle in that the more payload the vehicle can carry, the more profitable the vehicle can be.

With regard to the load limitations imposed by the axles and their functionally related components, a common approach to increasing the payload capacity has been to add one or more load supporting axles in the form of auxiliary axles commonly called pusher axles that are located between the steer axle and the drive axles; there commonly being two such drive axles employed in the heavy-duty vehicles. And in the case of pusher axles, it is common practice to suspend them in a retractable manner so that they may be deployed under the command of the vehicle operator as needed to aid in supporting the vehicle.

With regard to government regulations, the Federal Government in respect to bridges in the interstate system establishes weight limits on vehicles using the bridges wherein these limits are based on both the vehicle weight and the vehicle's wheelbase wherein the latter is measured as the distance between the center of the vehicle's foremost wheels and the center of the vehicle's rearmost wheels. With the greater this wheelbase, the more weight that is allowed under such restrictions.

As a result, a common approach to meeting such restrictions is to add a load bearing auxiliary axle commonly called a tag axle or trailing axle that is located a remote distance behind the vehicle and operates to significantly increase the payload capacity as well as the effective wheelbase of the vehicle. Examples of such in the case of a dump truck are disclosed in U.S. Pat. Nos. 5,823,629; 6,116,698; 6,247,712 and 6,189,901. Wherein this the tag axle, the tag axle is suspended from the rear end of the truck's dump body and thereby the truck's frame and on vehicle operator command is conditioned in either a stored inactive condition or an active condition. And wherein the tag axle is raised to a stored location above the rear end of the dump body out of the way of the dump body's tail gate in establishing the inactive condition and the tag axle is lowered to a remote location behind the truck frame in establishing the active condition and a down force is applied to the tag axle forcing the tag axle tires to bear against a road surface to thereby aid in supporting the truck frame as well as extending the effective wheelbase of the truck to a significant degree. And wherein the tag axle when in the active condition adds to the increased load capacity provided by other auxiliary axles commonly referred to as pusher axles that are located between the primary axles of the truck.

But in providing such a tag axle, it has been found that there are certain considerations to address that can enhance the ability of the tag axle and its functionally related components to perform to best advantage for the purposes intended. Such as the ability of the tag axle to efficiently support lateral loading on the vehicle frame tending to tilt the latter, efficiently accommodate certain varying road conditions at the tag axle wheels while addressing the effects of maintaining forced loading on the tag axle under certain road and tag axle suspension and tag axle tire conditions, efficiently accommodate braking the tag axle wheels while addressing the effect of such braking under certain road and tag axle suspension and tag axle tire conditions, and efficiently maintaining both forced loading on the tag axle and tag axle braking while addressing the effects of such under certain road and tag axle suspension and tag axle tire conditions.

SUMMARY OF THE INVENTION

The present invention in addressing the above areas of consideration resides in providing a payload-carrying motor vehicle comprising a steer axle, at least one drive axle and a tag axle and wherein all of the axles have wheels with tires and air brakes. A tag axle suspension system is adapted to suspend the tag axle in an active condition wherein the tag axle is pivotal about a first axis parallel to the other axles and also about a second axis located equidistant from the tag axle wheels and laying in a plane at right angles to the first axis and wherein the tag axle is forced to urge the tag axle tires against a road surface to aid in supporting the vehicle. An air brake system is adapted to operate the air brakes of all the wheels. And a tag axle operating system is adapted to establish the tag axle in the active condition while enabling operation of the air brakes of the tag axle wheels and to disable operation of the brakes of the tag axle wheels when the tag axle pivots about the second axis and reaches a predetermined tilt angle in maintaining the tag axle tires in contact with a road surface.

These and other features and aspects of the invention will become more apparent from the accompany drawings of exemplary embodiments of the present invention and from the description of the exemplary embodiments that follows.

DESCRIPTION OF THE DRAWINGS

FIG. 11 is a side view of the truck dumping a load;

FIG. 12 is a side view of the truck traveling over a crest in a road with the tag axle remaining in its active condition;

DESCRIPTION OF EXEMPLARY EMBODIMENTS

Figure 1:
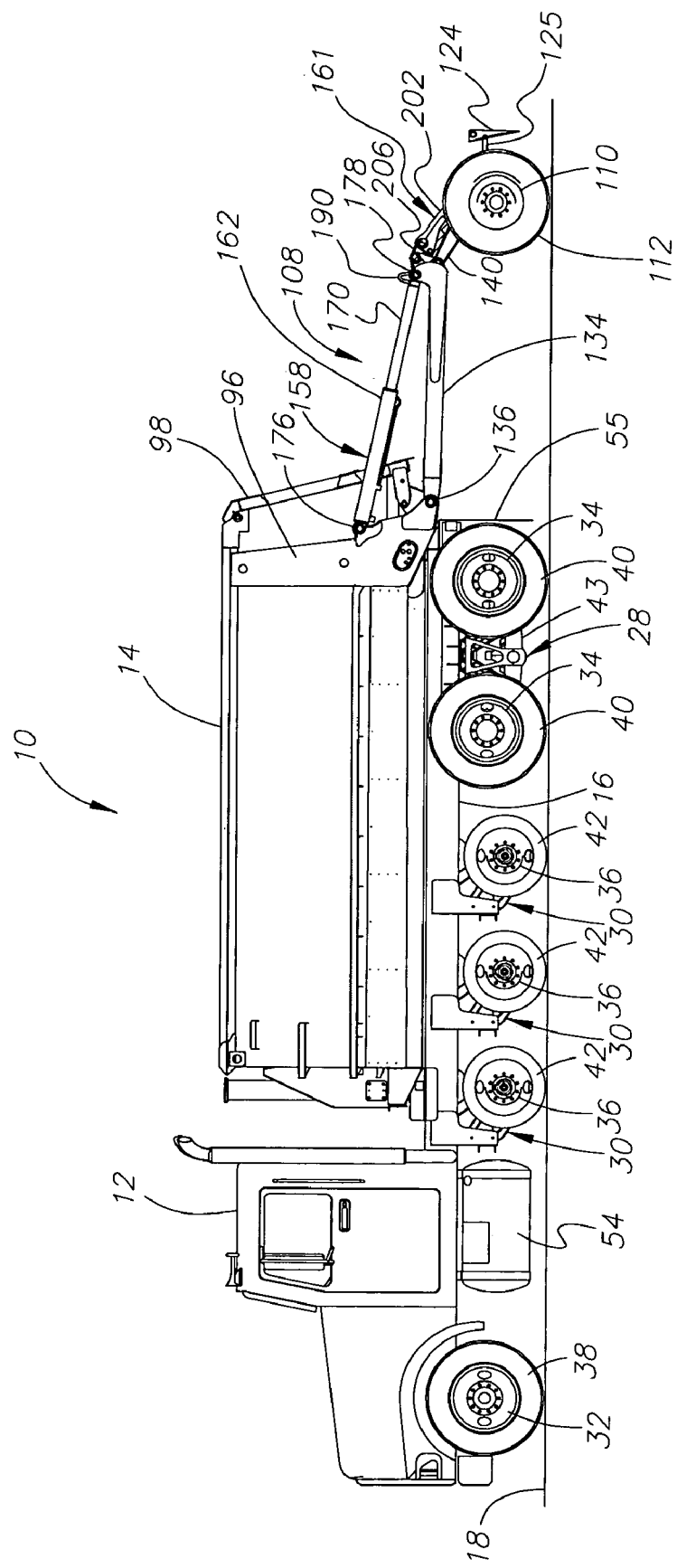
FIG. 1 is a side view of a dump truck embodying the present invention wherein the truck's articulating tag axle is shown in its active condition.

The present invention is disclosed as embodied in a payload-carrying motor vehicle in the form of a heavy-duty dump truck 10. Wherein the truck comprises a forwardly located cab 12 that serves as a vehicle operator and passenger compartment and a rearward located payload container 14 commonly referred to as the truck body that is open at the top and serves to contain a payload such as sand, gravel, dirt and refuse. And wherein the cab 12 and truck body 14 are mounted on a rigid frame 16 that is supported on a road surface 18 such as pavement or the ground by a forwardly located steer axle 20 of the beam type and rearward located tandem drive axles 22 which serve as the truck's primary axles and by three auxiliary pusher axles 24 of the beam type which are located between the steer axle and drive axles. See FIGS. 1, 2 and 7.

The steer axle 20, drive axles 22 and pusher axles 24 are suspended parallel to each other from laterally spaced locations on the frame 16 by suspension systems 26, 28, 30 and have wheels 32, 34, 36 with pneumatic tires 38, 40, 42, respectively. Wherein the steer axle 20 has a rated load capacity that is significantly greater than that of the pusher axles 24 and to a much lesser extent with respect to that of each of the drive axles 22 but whose combined rated load capacity is significantly greater than that of the steer axle. And wherein the pusher axle tires 42 are significantly smaller in diameter than the other wheels and tires.

Both the steer axle suspension system 26 and the drive axle suspension system 28 are leaf spring suspensions of a suitable conventional type. Wherein the drive axle suspension system is of the walking beam type having a centrally pivoted beam 43 on each drive wheel side that permits the associated foremost drive axle wheels and rearmost drive wheels to move up and down relative to each other to a significant extent in passing over bumps and depressions in a road surface. Whereas the pusher axle suspension systems 30 are gas spring suspension systems of a suitable conventional type having elastomeric bags 44 of uniform wall thickness which serve as gas springs when charged with a suitable gas that is typically air as in the exemplary embodiment and is supplied when the pusher axles are activated for operation and whose pressure is adjustable to adjust the weight that they support and also to some degree the weight supported by the steer axle 20 as described below.

The pusher axles 24 are activated by elastomeric bags 45 operatively associated with each pusher axle. See FIG. 7. Wherein the elastomeric bags 45 are operated by a conventional air pressure supply and control system (not shown) that is under the control of the truck operator and also serves the gas springs 44 in the pusher axle suspension systems 30. The pusher axles 24 are deployed simultaneously on the supply of air under pressure to the bags 45 from retracted positions (not shown) where these bags are exhausted and the pusher axle tires 42 do not contact with the road to a position where the pusher axle tires are located as shown for contact with the road. And with the pusher axles 24 thus deployed, the gas springs 44 in the pusher axle suspension systems are then supplied with air and at a suitable pressure at each pusher axle determined by individual pressure regulators (not shown) also under the control of the truck operator. Whereby the pusher axle tires 42 are then forced as shown to bear against the road surface in support of the truck frame 16 by the thus pressure charged gas springs 44.

The gas springs 44 are arranged with the pusher axles activated and in their respective suspension systems 30 at their factory recommended mean road height that is desired for normal bag life. And wherein the gas springs 44 in the exemplary embodiment are charged with an air pressure of about 50-psi that was found compatibly suitable for efficient operation with the other suspension systems, and can be individually adjusted at each pusher axle by the aforementioned pressure regulators for a desired weight distribution and also with respect to the weight carried by the steer axle 20 to a limited degree. And it will be also be understood that by reversing the above-described pusher axle gas spring activation and pusher axle deployment by exhausting the air pressure from the gas springs 44 and pusher axle positioning bags 45, the pusher axles 24 are returned to their retracted locations and the pusher axle gas springs are returned without air pressure to an inactive condition.

Figure 2:
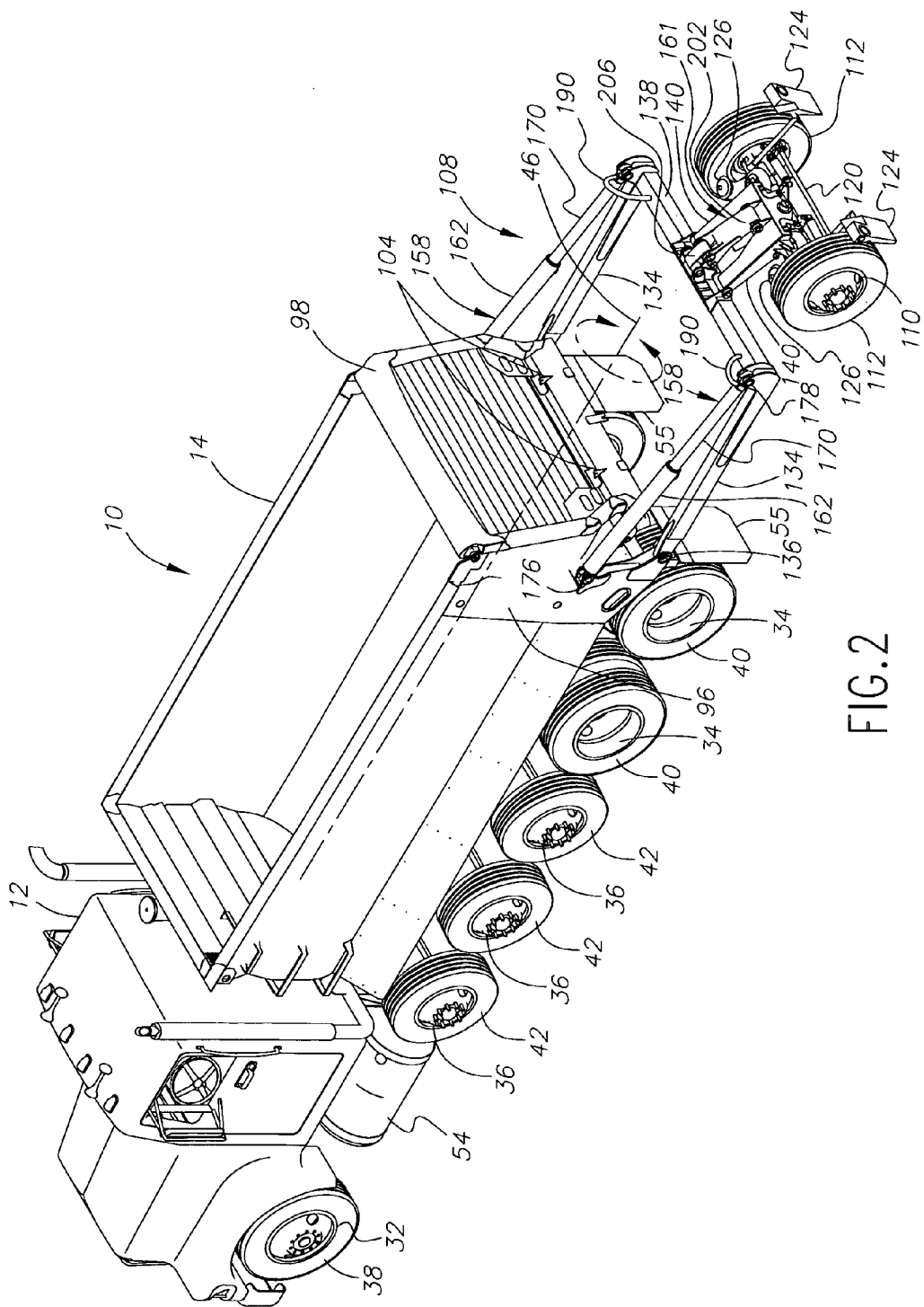
FIG. 2 is an isometric view of the truck with the tag axle in its active condition.

The arrangement and geometry of the above axle suspensions support the truck frame 16 in a desired ride height relationship that is substantially parallel to the road surface as shown in FIG. 1 when the truck body is loaded and unloaded. And wherein the truck is established with a roll axis 46 as shown in FIG. 2 and with respect to which the frame 16 can pitch and roll under control by the above axle suspensions and can also possibly yaw but to a very limited degree when the truck is turning at a high speed on a curved road.

The steer axle 20 is located forward of the cab 12 and its wheels 32 are mounted in a conventional manner on pivotal spindles (not shown) on the ends of the steer axle 20 and are steered from the cab by the vehicle operator acting through a tie rod and steering gear arrangement (not shown) of a suitable conventional type. The tandem drive axles 22 each include differential gear-driven axle shafts 47, are located beneath a rear portion of the truck body 14, and have dual wheels 34 that are connected to the outboard end of the respective axle shafts. See FIG. 7. The four drive axle wheels 34 are driven with power received from a power train 48 of a suitable conventional type having an engine 50 located forward of the cab 12 and together with a transmission 52 is controlled from the cab by the vehicle operator to deliver power to the drive axle wheels. And wherein fuel is supplied to the engine 50 by fuel tanks 54 that are mounted on the truck frame 16 in locations at opposites sides of and below the cab and frame. And mud flaps 55 are provided that are hung from the lower rear end of the truck body 14 to hang behind the rearmost drive axle tires 40.

The steer axle wheels 32, drive axle wheels 34 and pusher axle wheels 36 have air-operated service brakes 56, 58, 60 of a suitable conventional type, which are also referred to herein as simply air brakes and include what are commonly referred to as air pots 62, 64, 66, respectively, that serve the brake actuators (not shown) in applying braking force to the associated wheels. See FIGS. 7 and 8. And wherein the service brakes and air pots are part of an air brake system that further includes an air compressor 68 that is driven by the engine 50 and supplies air under pressure via a tank supply line 70 to an air tank system comprising a primary air tank 72 and three secondary air tanks 74 that serve as air pressure accumulators and are spaced along and mounted on an intermediate longitudinal portion of the frame. And wherein the secondary air tanks 74 are interconnected by separate air lines 76 and 77 and are connected to the primary tank 72 by an air line 78 connecting the closest secondary air tank and thus the other secondary air tanks to the primary air tank 72.

The air tank system further includes a pressure regulator (not shown) that regulates the pressure in the tank system to a suitable constant pressure for brake operation. Wherein the primary air tank 72 is connected by an air pressure supply line 80 to deliver the air at constant pressure to a foot-operated foot valve 82 of a suitable conventional type and by air pressure supply lines 84 to five like pilot-operated quick-release valves 86 that are also of a suitable conventional type.

The foot valve 82 is operated by the vehicle operator from the cab and when so operated supplies air at constant pressure from the air tank system via the brake supply 80 and an air brake line 88 and branch brake lines 90 directly to the steer axle brake air pots 62 to operate the steer axle service brakes 56 and via pilot pressure air lines 92 to the quick release valves 86 that are thereby conditioned to deliver the air at constant pressure from the air tank system via the associated supply lines 84 and thence separate and associated branch brake lines 94 to the drive axle brake air pots 64 and the pusher axle brake air pots 66 to operate the associated drive and pusher axle service brakes 58 and 60, respectively.

Continuing on with the other truck components, the truck body 14 is open at the top for receiving a load such as dirt, sand and gravel and is also open at the rear thereof. And wherein structural-reinforcing double-wall side panels 96 comprise and define the lateral extremities of the truck body at the open rear end thereof where an outwardly swinging tail gate 98 is hinged in a conventional manner to the upper end of the side panels. And it will be understood that upon the truck body receiving a load that is captured by the tail gate, the center of gravity of the truck has shifted upward to a significant degree and is then what is commonly called top heavy and more prone to rolling about the roll axis 46 in response to lateral loading on the truck frame when the vehicle is turning. Wherein the lateral loading increases with increasing vehicle speed and decreasing turn radius.

The truck body 14 is hinged in a conventional manner at the lower end of the side panels 96 to the truck frame 16 and is operated by a tilt body actuator 100. See FIG. 11. Wherein the actuator 100 is a hydraulically-operated multistage actuator of a suitable conventional type and is operatively connected between the frame 16 and the front end of the truck body 14 in a conventional pivotal manner. Whereby the truck body 14 can be tilted by operation of the actuator 100 from a nesting position on the truck frame 16 as shown in FIG. 1 to a steep-angled dumping position or attitude as shown in FIG. 11. A hydraulic circuit (not shown) of a suitable conventional type provides for operation of the truck body tilt actuator 100 and includes remote manual controls whereby the vehicle operator can operate the truck body tilt actuator 100 from within the cab and also while along side the truck. And with the pusher axles 24 normally retracted during backing up of the truck and then dumping of a load as shown in FIG. 11.

Figure 9:
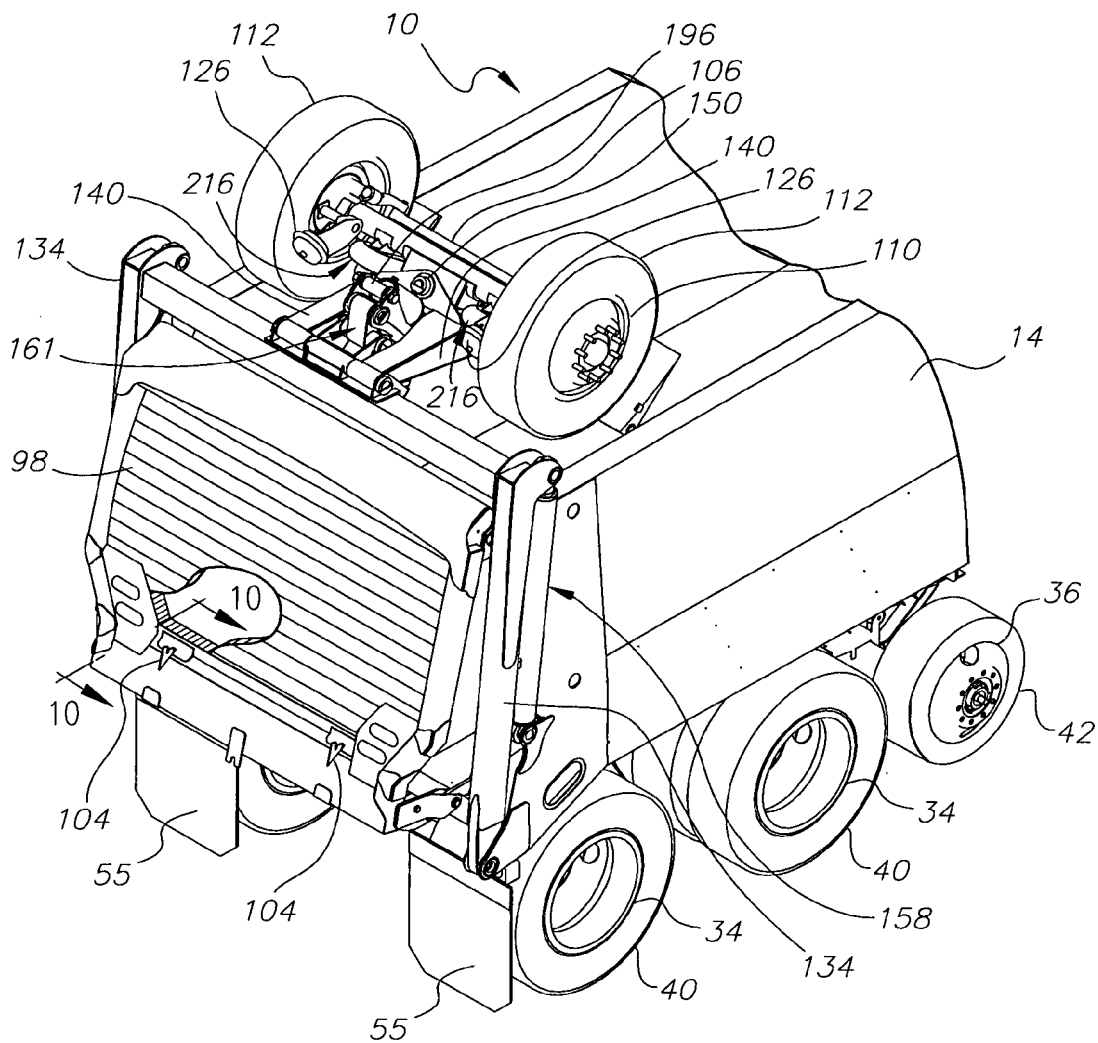
FIG. 9 is an isometric view of the rear end of the truck.
Figure 10:
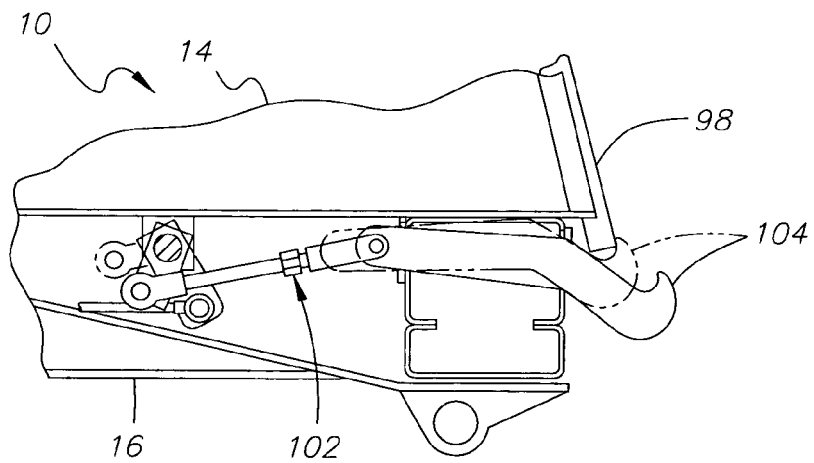
FIG. 10 is an enlarged view taken along the lines 10-10 in FIG. 9 when looking in the direction of the arrows.

The tailgate 98 is latched and held in a closed position as shown in FIGS. 2, 9 and 10 by a manually operated latching mechanism 102 of a conventional type of which only a portion is shown in FIG. 10 and includes twin, hook-type latches 104 that engage a lower edge portion of the tailgate to hold the tailgate in its closed position to prepare the truck body to receive a load. This holding condition of the latches 104 being shown in solid line in FIGS. 2 and 9 and in phantom line in FIG. 10. The truck body 14 after receiving a load and delivery to a drop site is then tilted by the truck body tilt actuator 100 with the latches 104 disengaged from the tailgate 98 as shown in solid line in FIG. 10 by operation of the latching mechanism 102. Whereupon the tailgate is forced to swing outwardly in the opening direction by the force of gravity and the force of the load acting thereon as the load is being dumped as shown in FIG. 11.

Figure 3:
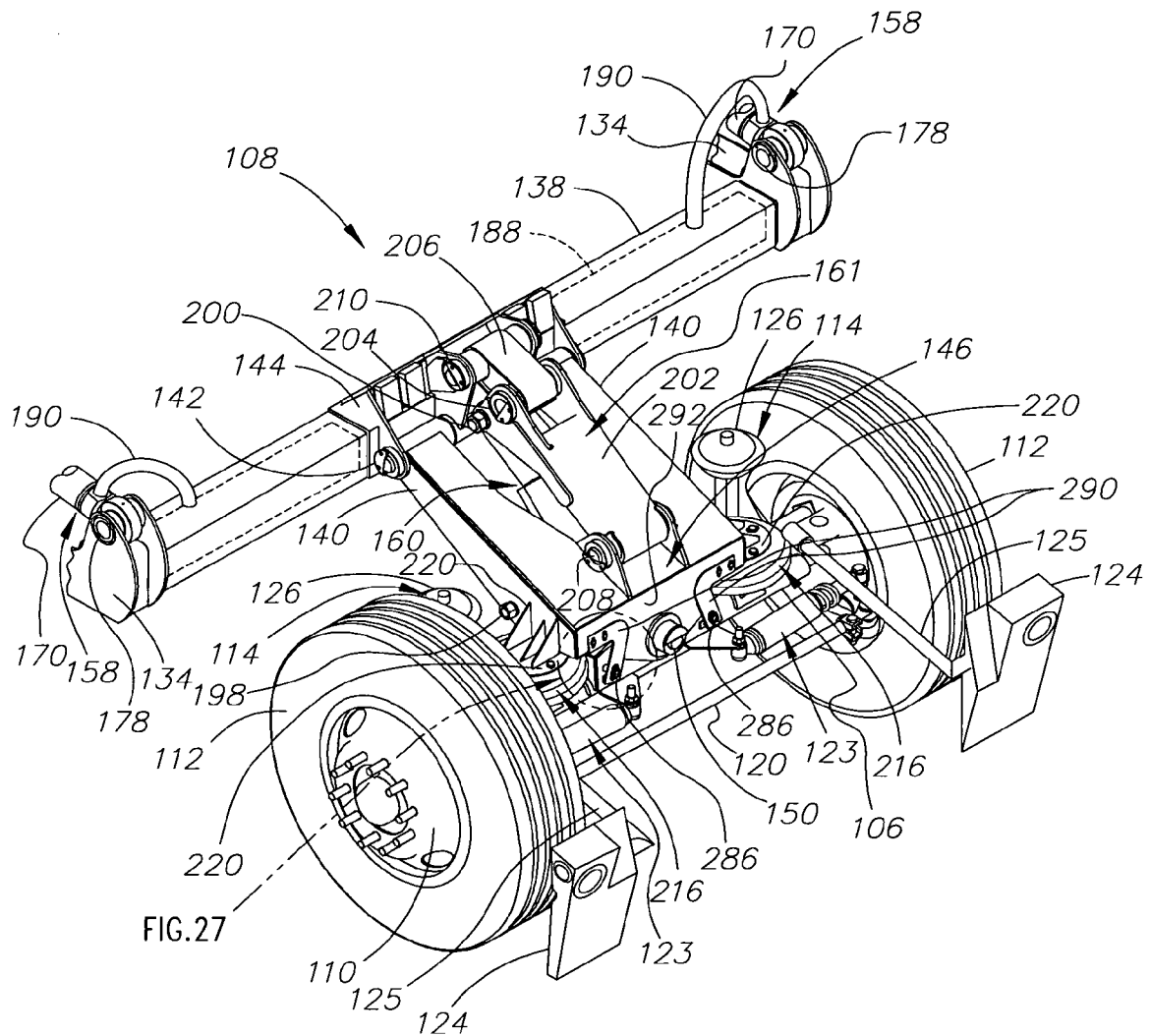
FIG. 3 is an enlarged portion of FIG. 2 showing the tag axle and related components.
Figure 7:
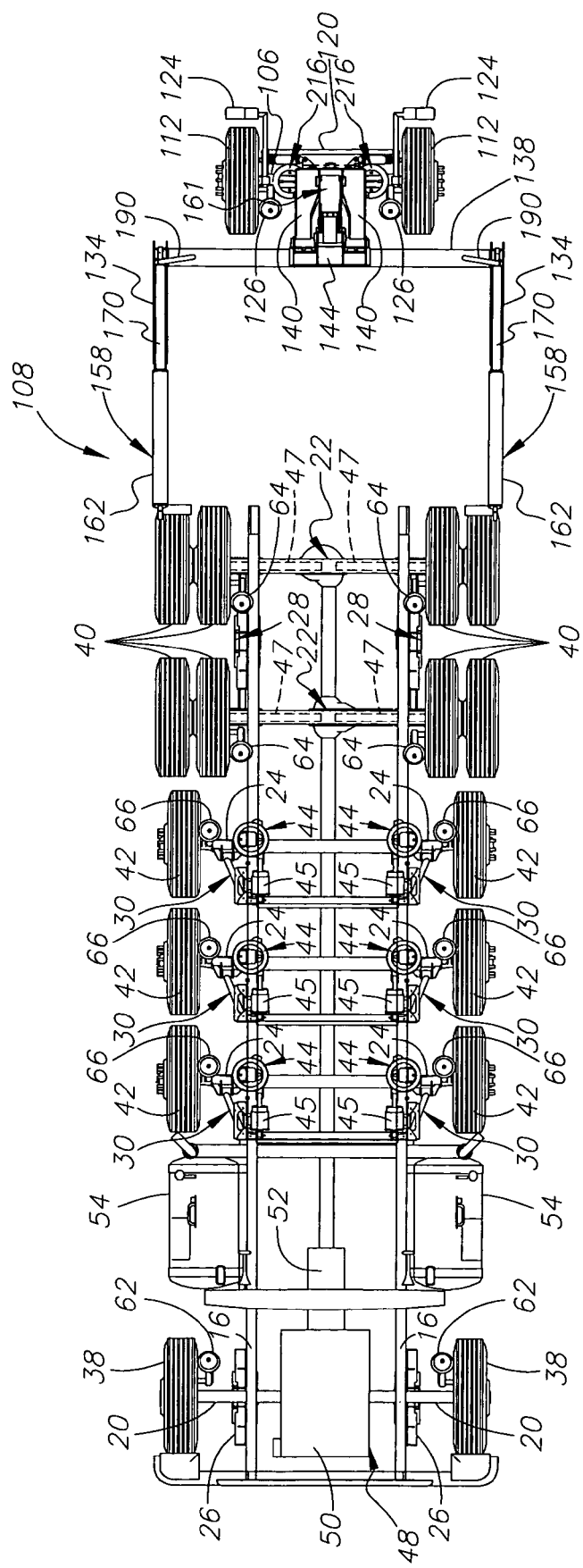
FIG. 7 is a plan view of the truck with the cab and truck body removed.

A tag axle 106, that is also referred to and a trailing auxiliary axle, is of the centrally pivoted type and is suspended from the rear end of the truck frame 16 in an articulating manner by a tag axle system 108 to thereby become an integral operational part of the truck. Wherein the tag axle 106 has wheels 110 with pneumatic tires 112 and service brakes 114 as seen in FIG. 3 and the track width of the tag axle wheels as seen in FIG. 7 is substantially the same as that of the inboard wheels 34 of the drive axles 22 and allows location of the tag axle with its wheels above the end of the truck body without interference by the latter when the tag axle is moved into this location as described later.

The tag axle wheels 110 are self-steering in that they are steered by truck motion as the truck is turned by the truck operator steering the steer axle wheels 32 and are rotatably mounted on spindles 116 that are pivotally connected with king pins 118 at a suitable camber and caster angle to the tag axle 106 next to the tag axle wheels and are interconnected by an adjustable tie rod 120. See FIGS. 3 and 4. Wherein the tie rod 120 is pivotally connected at its ends to one end of steer arms 122 that are rigidly joined at their other end to the tag axle wheel spindles 116. And wherein the tie rod 120 is adjusted lengthwise to provide the tag axle wheels with a suitable toe-in and the steerable tag axle wheels are stabilized and returned following their forced steerage to a normal neutral condition by two like coil spring/shock absorber assemblies 123 that are connected between the steer arms 122 and the tax axle assembly as described in more detail later. And with the tag axle wheels 110 being steerable, trailing fenders 124 having a tail light/brake light are provided for these wheels and are mounted with an arm 125 on the respective tag axle wheel spindles 116 to trail behind and thus turn conjointly with the respective tag axle wheels when the tag axle is in its active condition.

Figure 4:
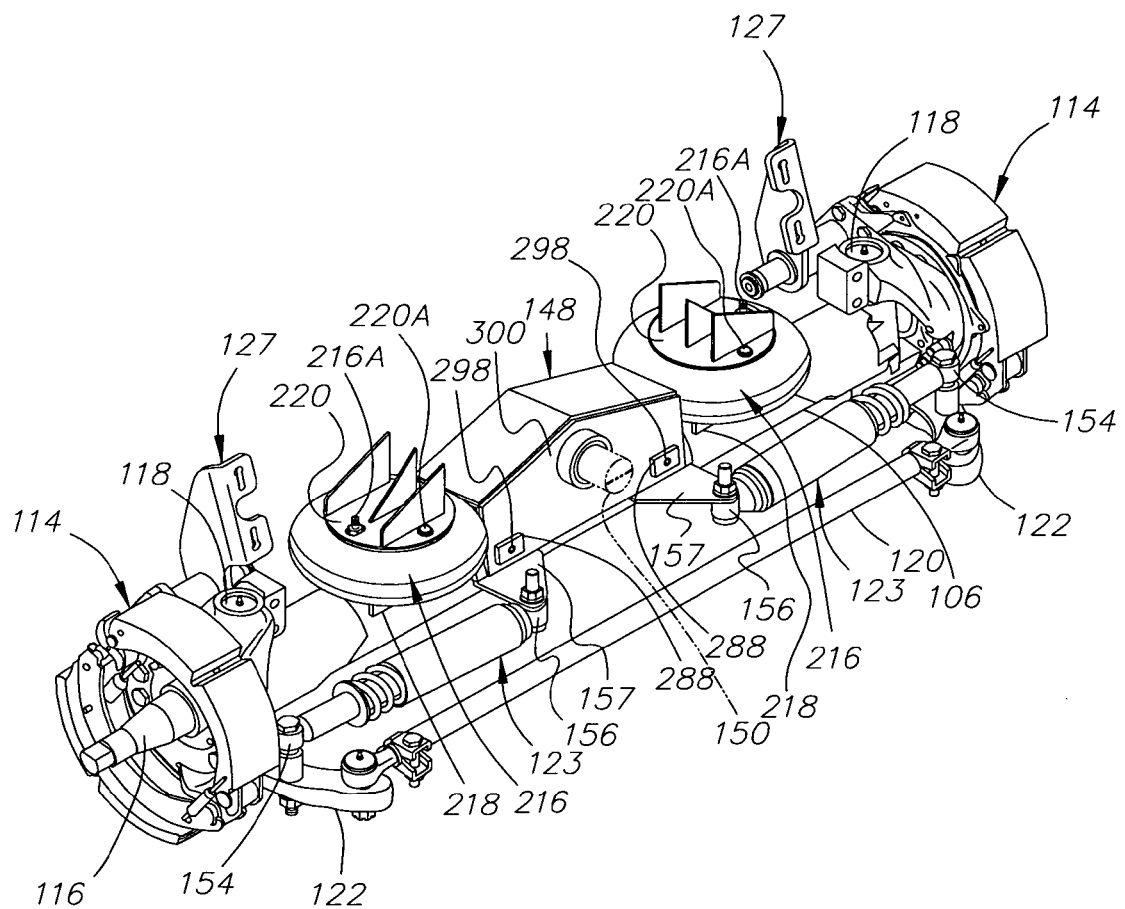
FIG. 4 is an isometric view of the tag axle assembly.

The tag axle service brakes 114 are conventional type air brakes like the other service brakes and include air pots 126 that are mounted on brake actuator assemblies 127 that are located on the inboard end of the wheel spindles 116 as shown in FIG. 4. And the air pots 126 are connected by a brake line 128 and branch brake lines 130 to receive air at a constant or regulated pressure for operation from the air tank system via the rear-most quick-release valve 86 serving the rear-most drive axle brakes 58, and a solenoid valve 132 that serves to enable and disable the tag axle brakes 114 by controlling air pressure supply thereto. See FIG. 8.

The solenoid valve 132 is normally closed when without power and receives power to open and thereby allow air pressure supply to the tag axle service brakes 114 to assist in braking the truck when the tag axle is in its active condition with the tag axle forced downward to assist in supporting the truck frame 16. But when the down force on the tag axle is relieved while the tag axle remains lowered under certain circumstances as described in detail later, power to the solenoid valve 132 is interrupted causing it to close and thereby disable the tag axle service brakes as also described in detail later.

Describing now the tag axle suspension system 108, it includes both a primary suspension arrangement and a secondary suspension arrangement and comprises parallel arranged suspension arms 134 that are pivotally connected at one end by a pivot pin 136 to a lower end portion of one of the truck body side panels 96 and thus in structurally reinforced manner to the rear end of the truck frame 16 through the hinged end of the truck body. And a hollow crossbeam 138 that extends parallel to the axles 20, 22, 24 rigidly connects the suspension arms 134 together at their other end across the width of the truck body. The pivot pins 136 are axially aligned and support the suspension arms 134 and crossbeam 138 for swinging movement about an axis extending transversely of the truck frame parallel to the axles 20, 22, and 24 and thus in a pitching direction with respect to the roll axis 46. See FIG. 2.

The tag axle 106 is linked to the crossbeam 138 and thereby to the outer end of the suspension arms 134 by suspension arms 140 that are considerably shorter than the suspension arms 134, are pivotally connected at one end by a pivot pin 142 to a tag axle anchoring bracket 144 that is welded to the crossbeam 138, and are welded at their other end to a tag axle carriage 146 to form an integral portion thereof. See FIGS. 1-3 and 17. The pivot pins 142 thus connecting the inner end of the short suspension arms 140 to the outer end of the long suspension arms 134 are axially aligned and provide a pivot axis for the short suspension arms 140 parallel to that of the significantly longer suspension arms.

A trunnion body 148 is welded to the tag axle 106 at a central location on the tag axle and is received in a sandwiching manner by opposing sides of the carriage 146. And the tag axle 106 is pivotally connected equidistant from its ends to the tag axle carriage 146 by a pivot pin 150 that extends through axially aligned cylindrical collars 151 on the sandwiching sides of the tag axle carriage and through axially aligned cylindrical collars 152 on the intermediately located tag axle trunnion body 148. See FIGS. 4 and 28. Wherein the pivot pin 150 is located by the collars 152 at a location offset from the centerline of the tag axle 106 and together with the trunnion body 148 form a tag axle trunnion mounting the tag axle 106 on the carriage 146 for pivotal or tilting tag axle motion at a location equidistant from the ends of the tag axle and in a plane at substantially right angles to the roll axis 46 when the truck is on a level surface and the tag axle is in its active condition as described later.

The trunnion body 148 is further utilized in connection with the tag axle 106 when the latter is deployed in that the steerable tag axle wheels 110 are stabilized in a non-steering condition and returned to this condition following their forced steerage with turning of the truck by the coil spring/shock absorber assemblies 123 that are connected between the steer arms 122 and the trunnion body 148 and also serve to maintain the tag axle wheels in their non-steering condition while the tag axle is raised and lowered. Wherein the coil spring/shock absorber assemblies 123 are mounted for these purposes at their shock absorber piston rod end in a sleeved elastomeric bushing (not shown) in a cylindrical pocket 154 in the respective steer arms midway thereof and are pivotally connected at the closed end of their shock absorber by a pivotal joint 156 to an arm 157 fixed to the trunnion body 148 at a location that is outboard of and below the tag axle pivot pin 150. See FIGS. 3 and 4.

The centerline of the tag axle pivot pin 150 is located equidistant from the tag axle wheels 110 and lays in a plane at right angles to the pivot axis of the long suspension arms 134 and is located above the centerline of the tag axle 106 when the truck is on a level surface and the tag axle is in its active condition. And the tag axle 106 while in its active condition is thereby suspended from the truck frame 16 via the truck body 14 parallel to the other axles for swinging or pivotal movement about a first axis extending parallel to the steer, drive and pusher axles established by the long suspension arm pivot pins 134 and also for tilting or swinging about a second axis established by the tag axle pivot pin 150 which is thus located equidistant from the tag axle wheels and lays in a plane at right angles to the aforementioned first axis.

The tag axle suspension system 108 further comprises two parallel-arranged primary actuators 158 and a secondary actuator 160 that is also referred to herein as a toggle cylinder and operates in series relationship with the primary actuators in the tag axle suspension system. See FIG. 17. The primary actuators 158 and the toggle cylinder 160 provide separate functions in forming together with the long suspension arms 134 and short suspension arms 140 the primary tag axle suspension in the tag axle suspension system 108 for the tag axle 106 wherein the toggle cylinder operates through toggle linkage 161 to position and hold the tag axle carriage 146 and thereby the tag axle 106 in certain spatial relationships with respect to the long suspension arms 134 when the tag axle is raised and lowered as described in detail later. Whereas the primary actuators 158 incorporate a gas spring and operate in the primary tag axle suspension to raise and lower the tag axle and force the tag axle when lowered to accept a predetermined load while providing hydraulically forced gas spring action accommodating large up and down movement of the tag axle as described in detail later.

Figure 5:
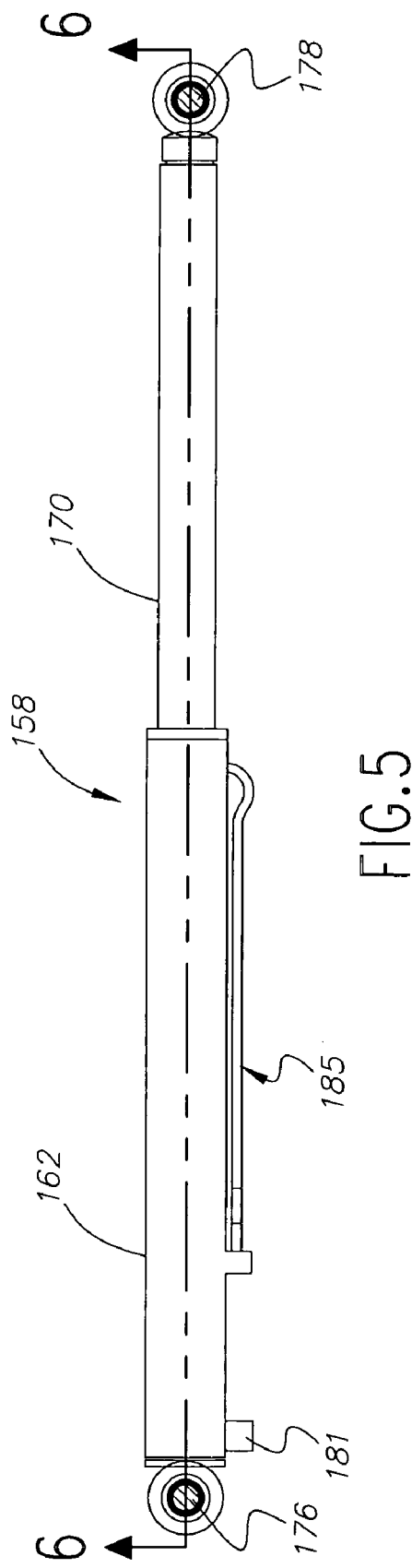
FIG. 5 is an enlarged side view of one of the primary actuators in the tag axle suspension system.
Figure 6:
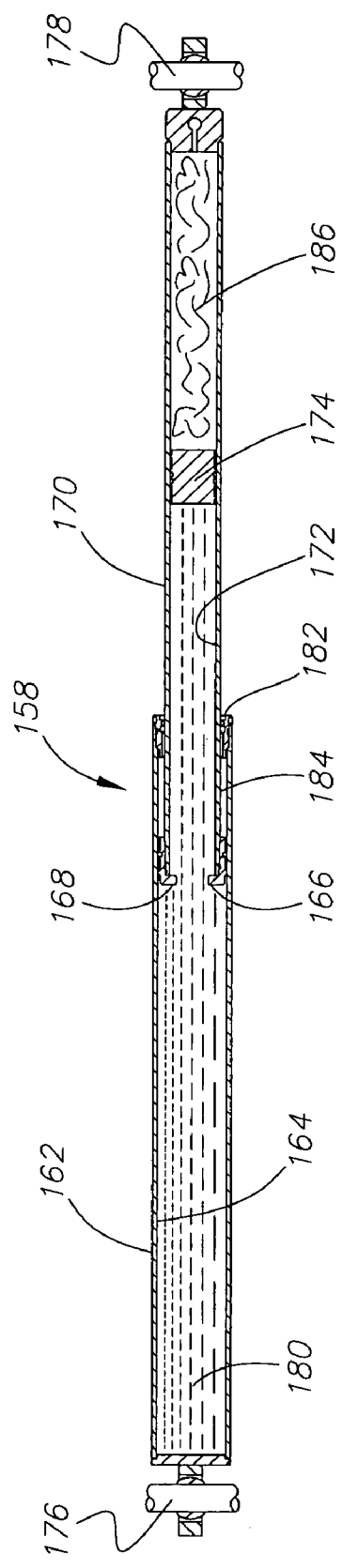
FIG. 6 is a view taken along the lines 6-6 in FIG. 5 when looking in the direction of the arrows.

The primary actuators 158 are located on opposite sides of the truck body, extend along the upper side of the long suspension arms 134 and are connected between the outer end of these arms and the rear end of the truck frame 16 via the lower end of the truck body side panels 96. Referring to FIGS. 5 and 6, the primary actuators 158 comprise a cylinder 162 that is closed at one end and has a bore 164 receiving a double-faced piston 166 that is acted on at both faces by hydraulic pressure and is hereinafter also referred to as a hydraulic piston. The piston 166 has a central opening 168 extending there through and is rigidly secured to one end of a hollow piston rod 170 that extends outward from the cylinder 162 and terminates with a closed outer end. The piston rod 170 has a bore 172 extending inwardly from the central opening 168 in the piston 166 receiving a rod-less double-faced piston 174 that is acted on by both hydraulic pre and gas pressure and is hereinafter also referred to as an accumulator piston to distinguish it from the hydraulic piston 166 and in a functionally related manner. And wherein the accumulator piston 174 is captured in the piston rod bore 172 by the piston 166 whose central opening 168 for that purpose is smaller in diameter than that of the accumulator piston.

The cylinders 162 of the primary actuators 158 are pivotally connected at their closed end by axially aligned pivot pins 176 to a lower end portion of the truck body side panels 96 at locations above the long suspension arm pivot pins 136 and thus like these arms in a structurally reinforced manner to the rear end of the truck frame 16 by the hinged end of the truck body. And the hollow piston rods 170 of the primary actuators 158 which also provide cylinders for the respective accumulator pistons 174 are pivotally connected at their closed end by axially aligned pivot pins 178 to the outer ends of the long suspension arms 134 and thus to the tag axle carriage 146 via the crossbeam 138.

The closed end of the primary cylinders 162 cooperates with one annular face of the associated piston 166, cylinder bore 164, one end face of the accumulator piston 174 and the rod bore 172 to define a hydraulic chamber 180 at this end of the cylinder which is accessed by a hydraulic line fitting 181. The other end of the primary cylinders 162 has a detachable collar 182 that cooperates with the associated cylinder bore 164 and the other slightly smaller annular face of the piston 166 to define a hydraulic chamber 184 at this end of the cylinder 162, which is accessed by a hydraulic line fitting assembly 185. While the closed end of the piston rods 170 cooperates with the other end face of the respective accumulator piston 174 and rod bore 172 to define a variable volume gas chamber 186 at this end of the primary actuators 158 which is accessed by a port 187.

A cylindrical tank 188 that serves as a gas pressure accumulator and a large extension of the expansible gas chamber 186 in the primary actuators 158 is mounted in the hollow crossbeam 138 and is connected at opposite ends by flexible hoses 190 to the respective gas chambers. See FIGS. 2 and 3. The gas accumulator 188 is of a size that substantially fills the crossbeam 138 in maximizing the gas volume available and together with the connected hoses 190 and the variable volume gas chamber 186 in each of the primary actuators 158 form a closed gas circuit. That is charged with a suitable gas free of water vapor and at a suitable pressure to thereby form with the variable volume gas chamber in each primary actuator a gas spring that acts on the tag axle. In the exemplary embodiment, this gas is nitrogen and its charge pressure is about 85-87 percent of a certain operating hydraulic pressure in the tag axle operating system when the tag axle is lowered and established in its active condition as described in more detail later.

The toggle cylinder 160 operates through the toggle linkage 161 to position and hold the tag axle 106 in two fixed positions with respect to the long suspension arms 134 and is located intermediate the short suspension arms 140 and connected by the toggle linkage 161 between the tag axle anchoring bracket 144 and the tag axle carriage 146. And wherein the toggle cylinder 160 is of a conventional hydraulically-operated type comprising a hydraulic cylinder 192 that is closed at one end and a piston 194 that is received in the cylinder 192 and has a piston rod 196 extending outward thereof. See FIGS. 17, 20 and 24-26.

Figure 17:
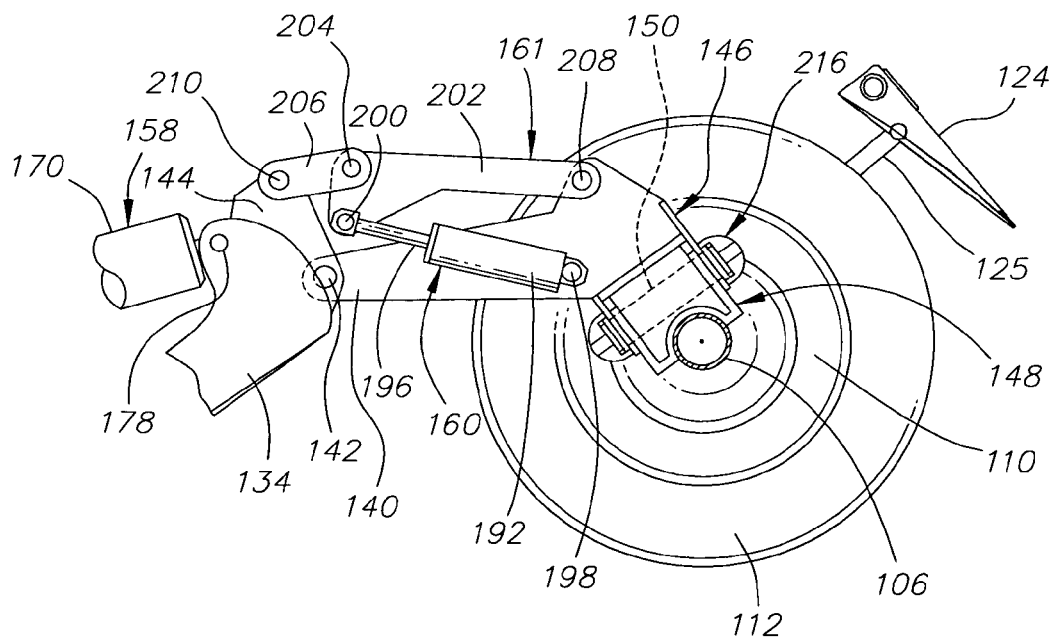
FIG. 17 is an enlarged view of a portion of FIG. 16.

As shown in FIGS. 3 and 17, the closed end of the hydraulic cylinder 192 is pivotally connected to the short suspension arms 140 at a location near the tag axle carriage 146 by a pivot pin 198 and the outer end of the piston rod 196 is pivotally connected by a pivot pin 200 to one end of a toggle arm 202 that is also pivotally connected at this end by a pivot pin 204 to one end of a toggle link 206 that is short as compared to the toggle arm and together therewith comprise the toggle linkage 161. The other end of the toggle arm 202 is pivotally connected by a pivot pin 208 to the tag axle carriage 146 and the other end of the toggle link 206 is pivotally connected by a pivot pin 210 to the tag axle anchoring bracket 144 at a location laterally spaced from the short suspension arm pivot pins 142.

Figure 21:
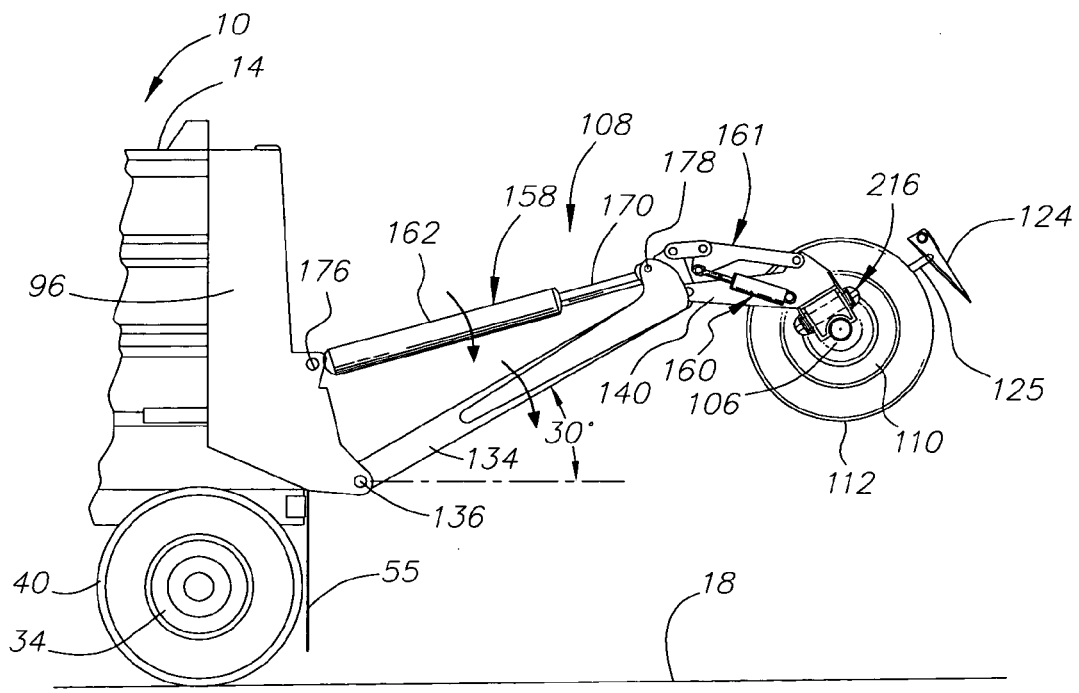
FIG. 21 is a view like FIG. 16 but showing the tag axle being lowered and at an intermediate location where the tag axle has then been toggled into position for eventual operation.
Figure 22:
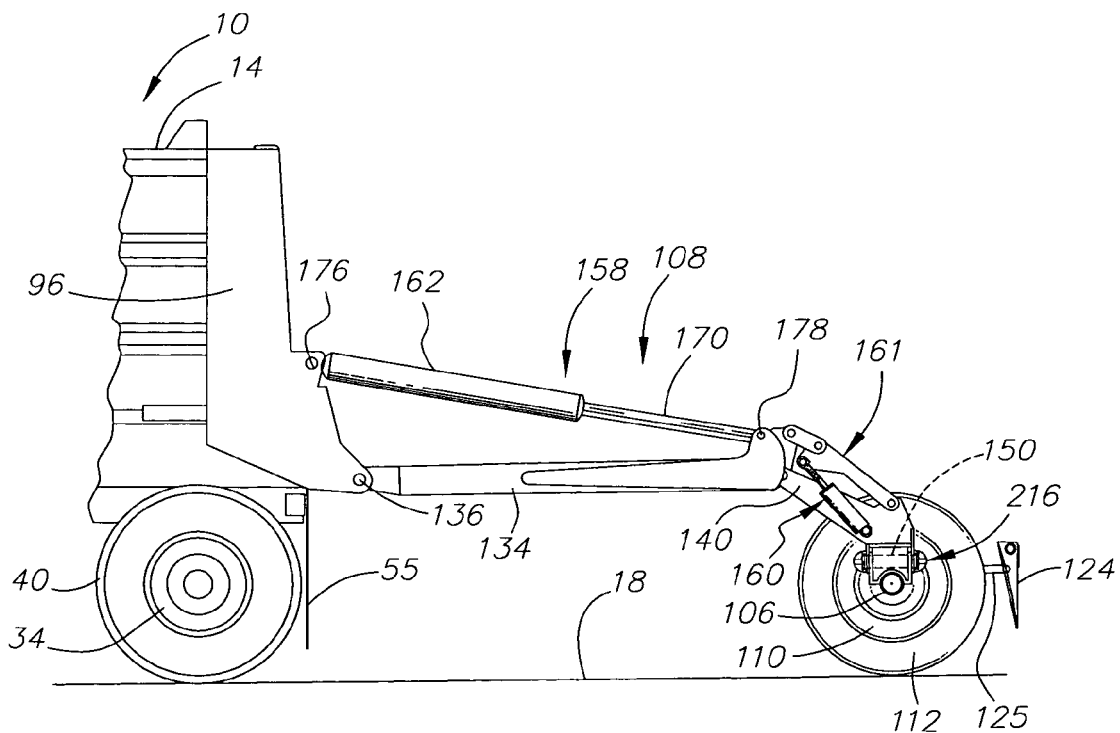
FIG. 22 is a view like FIG. 21 but enlarged and showing the tag axle fully lowered and in its active condition.

The pivotal arrangement of the arm 202 and link 206 in the toggle linkage 161 is such that with the piston rod 196 extended to the maximum extent possible by its piston 194 in the hydraulic cylinder 192, the centerline of the pivot pin 204 is located slightly to one side of a plane passing through the centerlines of pivot pins 208 and in the direction away from the toggle cylinder 160 and thereby establishing the toggle linkage in an over-center locked condition. See FIGS. 16, 17, 18, 21 and 22. Whereby when the tag axle tires 112 are forced against the road surface with the toggle linkage 161 in its over-center locked condition as shown in FIG. 22, the reaction force on the tag axle 106 acts to pull on the already fully extended piston rod 196. As a result, the more locked the toggle linkage 161 becomes in holding the tag axle down with the toggle cylinder 160 with the force being applied on the tag axle 106 by the primary actuators 158. And the toggle cylinder 160 being of a conventional type has hydraulic chambers 212 and 214 at opposite sides of the piston 194 (see FIGS. 24-26) for receiving hydraulic fluid under pressure to respectively extend and retract the piston rod 146 and toggle the tag axle 106 as described in detail later.

Figures 18, 19:
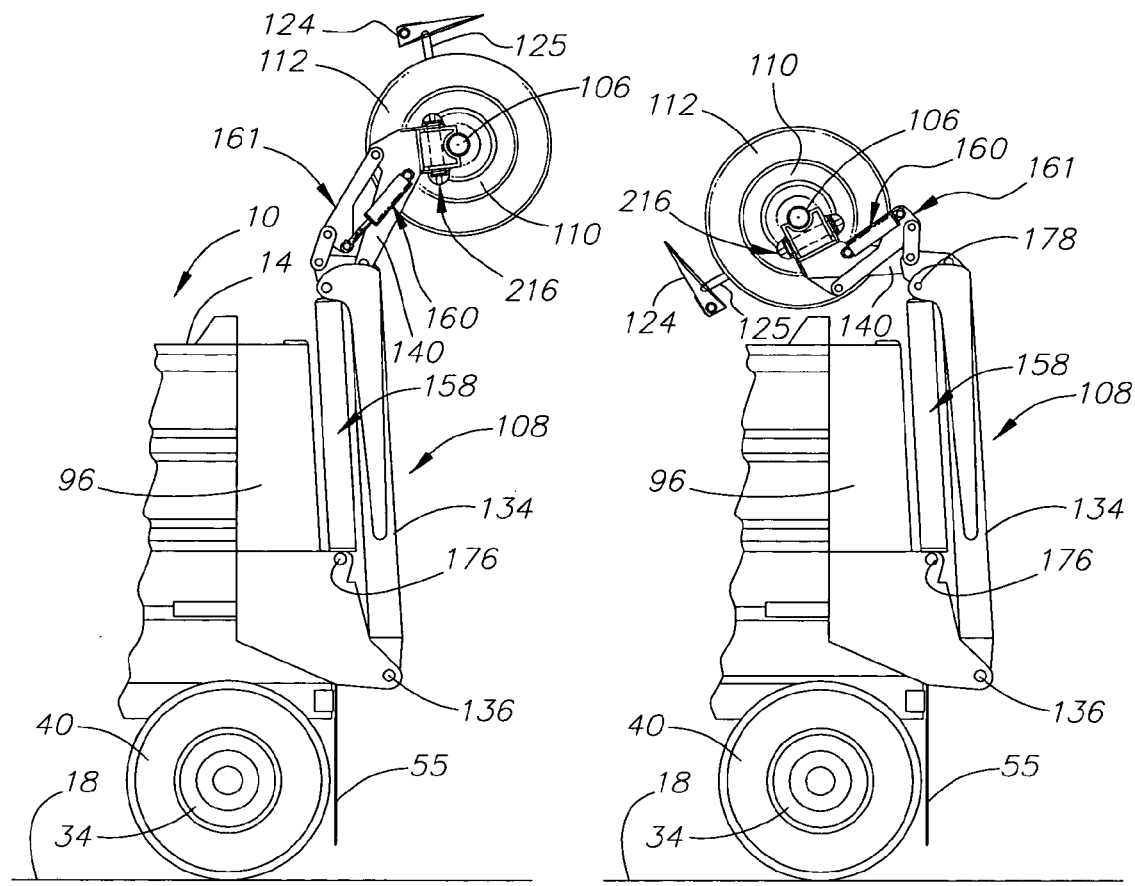
FIG. 18 is a view like FIG. 16 but showing the tag axle raised and just prior to the tag axle being toggled into position in its stored inactive condition.
FIG. 19 is a view like FIG. 18 but showing the tag axle toggled into position in its stored inactive condition.
Figure 20:
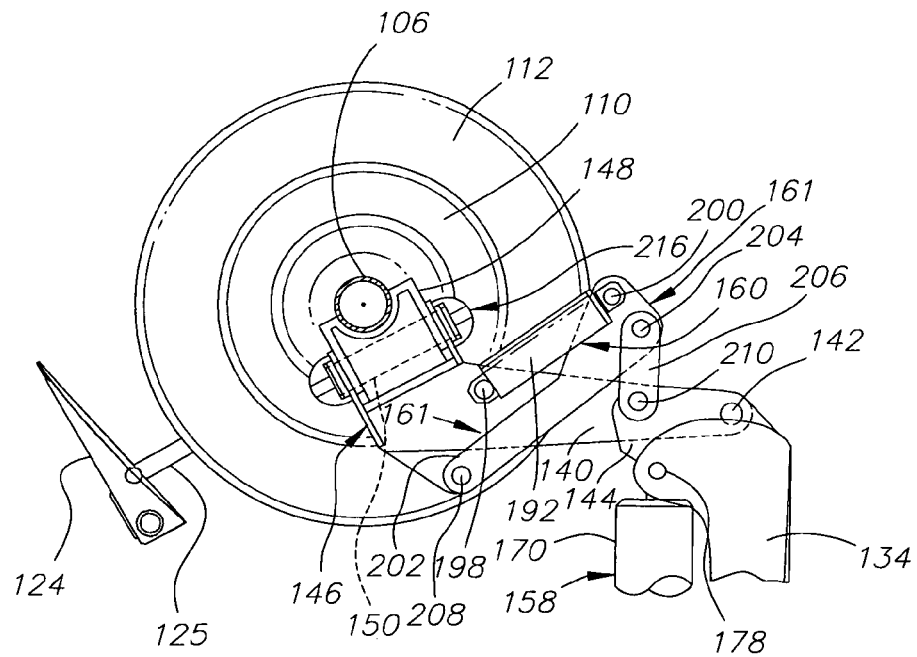
FIG. 20 is an enlarged view of a portion of FIG. 19.

The primary actuators 158 and the secondary actuator or toggle cylinder 160 are operable to position the tag axle 106 in a stored inactive condition in a location above the rear end of the truck body out of the way of the tail gate as shown in FIGS. 9, 19 and 20 and in a deployed active condition at a remote trailing location where the tag axle trails behind the truck frame and drive axles as shown in FIG. 22. And in the exemplary embodiment, this trailing distance is for example set at 10-12 feet in the setup of the tag axle suspension system geometry depending on the intended truck usage and thereby increases the effective wheelbase of the truck to a very significant degree. And wherein a certain operating or working hydraulic pressure together with gas pressure in the tag axle operating system operate to apply a prescribed down force on the tag axle forcing the tag axle tires to bear against a road surface thereby forcing the tag axle to accept a prescribed load with gas spring action to aid in supporting the truck frame and the existing weight or load thereon together with the other axles and their tires.

Such operation is described in more detail later but it is to be understood at this point that the tag axle 106 while in its active condition is suspended from the truck frame 16 by the tag axle suspension system 108 in a manner wherein the tag axle is linked by the suspension arms 134 and 140 to move laterally conjointly with the truck frame 16. And wherein the primary actuators 158 together with the suspension arms 134 and 140 and in forming the primary tag axle suspension in the tag axle suspension system 108 allows and controls substantial pitching motion of the tag axle 106 and thus up and down movement of the tag axle wheels 110 in relation to the truck frame 16 and roll axis 46 in maintaining the tag axle tires 112 in load bearing contact with the road when passing over bumps and dips and holes in the road. And also after the steer, drive and pusher axles of the truck first pass over a considerable or extreme but brief change in elevation such as can occur in passing over a high crest in the road at a railroad crossing as shown in FIG. 12. And wherein the primary tag axle suspension with the primary actuators 158 and the centrally pivoted tag axle 106 helps support the down force on the truck frame 16 together with the other axles except for lateral loading on the truck frame by reason of the tag axle mounting.

Figure 14:
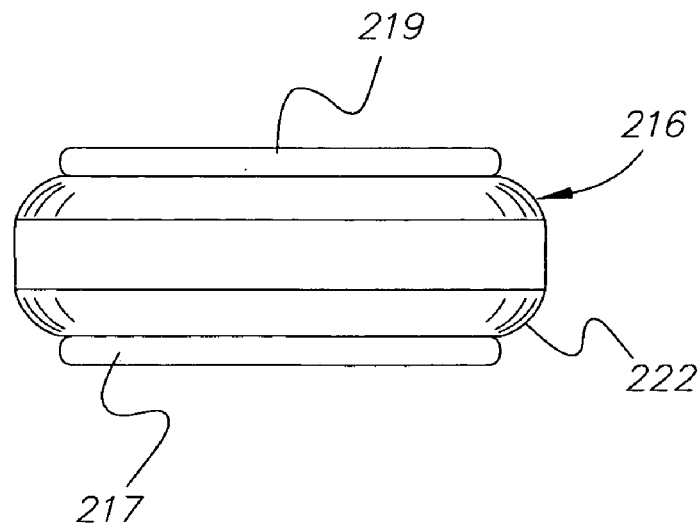
FIG. 14 is a side view of one of the tag axle gas springs.
Figure 15:
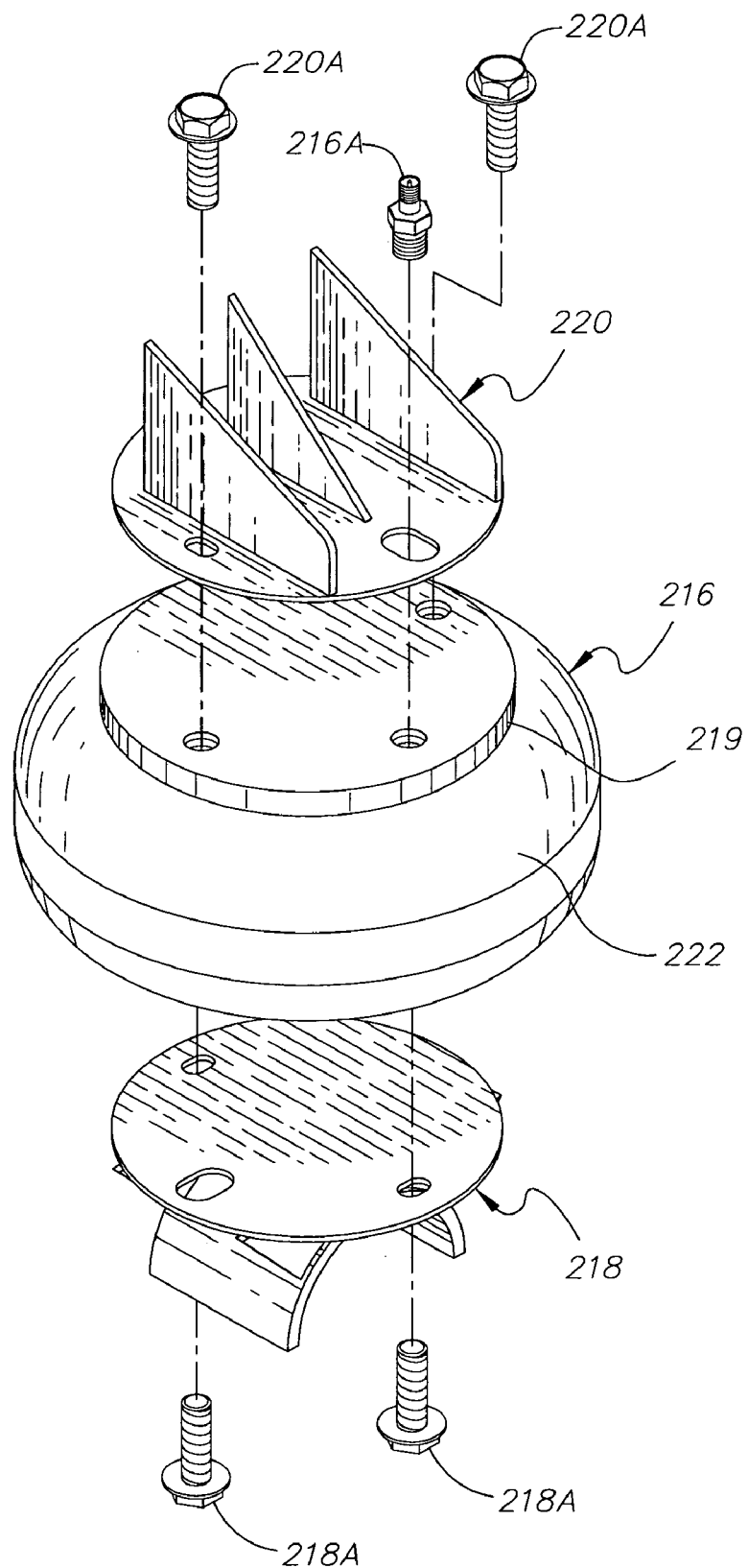
FIG. 15 is an exploded isometric view of one of the tag axle gas spring assemblies.
Figure 16:
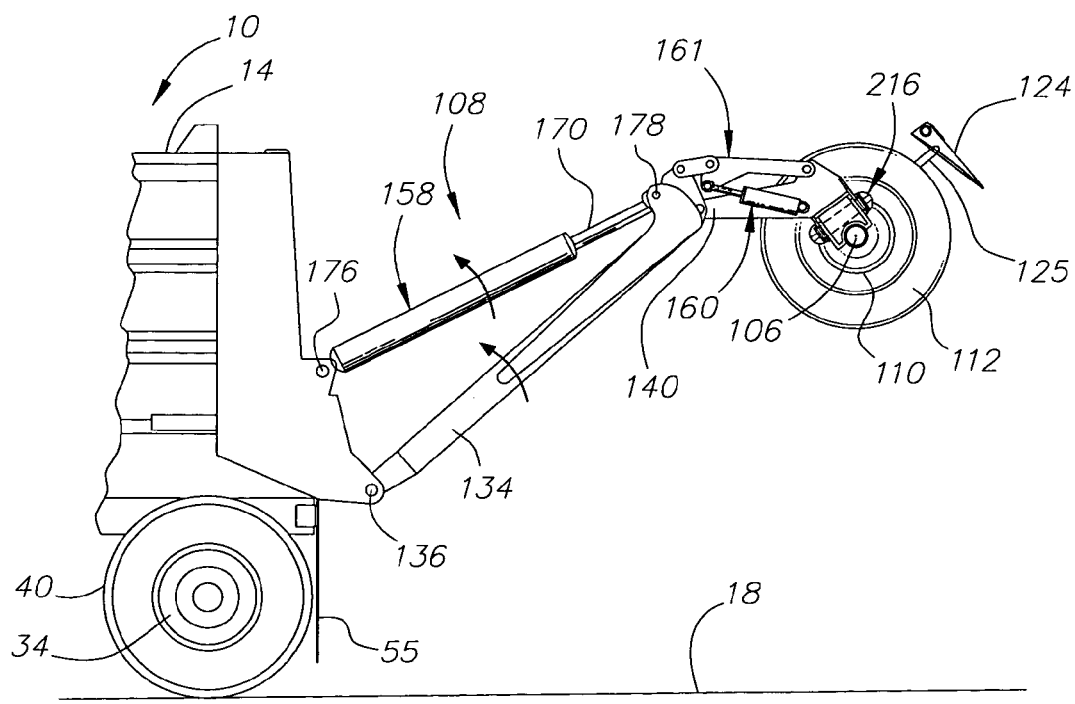
FIG. 16 is an enlarged side view of the rear portion of the truck showing the tag axle being raised and wherein certain components have been broken away and omitted revealing the tag axle assembly, certain components directly associated with the suspension of the tag axle including the toggle linkage, and the far-side tag axle wheel and tire.

The secondary tag axle suspension in the tag axle suspension system 108 operates in a secondary manner with respect to the primary tag axle suspension and comprises the tag axle 106 as pivotally mounted on the carriage 146 and gas springs 216 of elastomeric bag construction like the pusher axle gas springs 44 which are located on opposite sides of the pivot pin 150 and operatively connected between the tag axle and the carriage 146 that constitutes the end of the primary tag axle suspension. See FIGS. 3 and 29. The gas springs 216 are continuously filled with air under pressure unlike the pusher axle gas springs 44 and each have an integral base plate 217 that is fixed to a lower mounting bracket 218 with bolts 218A and an integral top plate 219 that fixed to an upper mounting bracket 220 with bolts 220A. See FIGS. 14 and 15.

The gas springs 216 are mounted in the secondary tag axle suspension in a strategic manner at locations in close proximity to the tag axle pivot pin 150 intermediate the latter and the tag axle wheels 110 with their lower bracket 218 welded to the upper side of the tag axle 106 and their upper mounting bracket 220 welded to an outer side of the tag axle carriage 146 that faces the respective gas spring 216. Whereby the tag axle gas springs 216 are arranged in the secondary tag axle suspension so as to accept and accommodate only the lateral loads or forces on the truck frame acting to tilt the frame.

While the primary actuators 158 acting through the long suspension arms 134 in the primary tag axle suspension accept and accommodate the loads or forces on the truck frame acting downward on the truck frame but not to tilt the frame as well as allowing very significant up and down movement of the tag axle because of differences in road elevation between the tag axle and the other axles.

The tag axle gas springs 216 have an air charge nipple 216A that is like a Schrader valve and are charged via their nipple with air at a pressure of about 100-psi or twice that of the pusher axle gas springs 44 and also unlike the pusher axle gas springs remain charged. And with the tag axle 106 deployed and in its active condition, the tag axle gas springs 216 like the pusher axle gas springs 44 are arranged at their factory recommended mean road height that is desired for normal bag life. And also unlike the pusher axle gas springs 44, the tag axle gas springs 216 in addition to having a significantly higher air pressure also have a significantly smaller spring compliance or stroke than the pusher axle gas springs and thereby contribute significantly in stabilizing the truck frame under lateral loading. Wherein the gas springs 216 only need a relatively small stroke because of their close proximity to the tag axle pivot pin 150 and thereby have the ability to allow proportionally greater tag axle wheel amplitudes but not to the extent of that allowed of the pusher axle wheels by their gas springs 44. And the secondary tag axle suspension with the pivotal tag axle 106 and gas springs 216 thus contributes to a significant degree in supporting lateral loading on the truck frame and with the ability to also efficiently accommodate bumps and depressions to a satisfactory degree while also preventing transmittal of shock loads at the tag axle wheels back to the truck frame such as occurs when one of the tag axle tires encounters a pothole.

Figure 13:
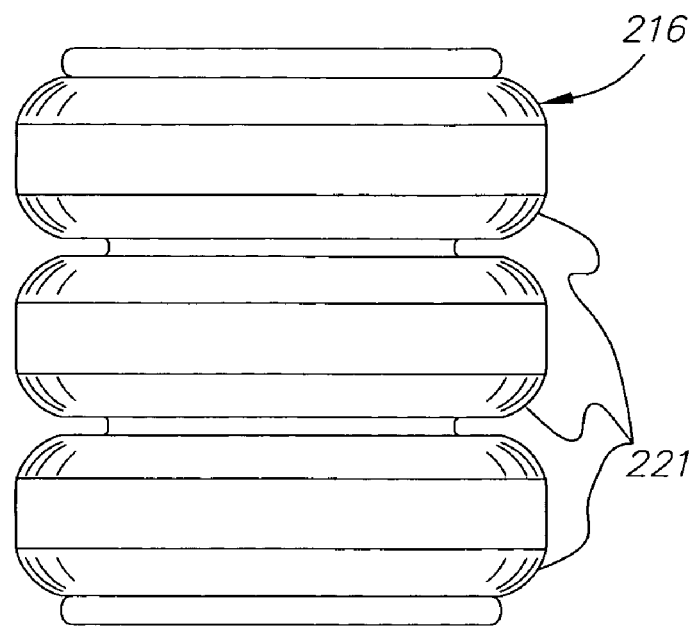
FIG. 13 is a side view of one of the pusher axle gas springs.

In comparing the characteristics of the tag axle gas springs 216 and their mounting to the spring characteristics and arrangement of the other axle suspension systems which contribute to the enhanced use of the tag axle 106, the pusher axle gas springs 44 have three annular elastomeric wall sections 221 of exterior convex shape (see FIG. 13) and about a 13.5-inches spring compliance or stroke in order to accommodate up and down movement of the pusher axle wheels 36 relative to the truck frame to a desired degree as the truck passes over bumps and dips and holes in a road surface while continuing to support the truck frame. Wherein the pusher axle gas springs 44 as arranged in their suspensions systems on the truck allow upward pusher axle wheel movement relative to the truck frame up to about 8.5-inches as determined by suitably arranged bump stops (not shown) to accommodate bumps in a road up to such height and allow maximum downward pusher axle wheel movement relative to the truck frame of about 3.75-inches to accommodate road depressions to that depth and still continue to support the truck frame. The total allowed up and down movement of the pusher axle wheels 36 is thus 12.25-inches and the significant difference between the allowed upward movement and allowed downward movement of the pusher axle wheels is typical and allows the pusher axle gas springs 44 to accommodate road bumps of considerable height but road dips or depressions to a significantly lesser degree. And where the depth of the road depression such as a dip or pothole does exceed the limit of downward movement allowed of the pusher axle wheels by their gas springs 44, the pusher axle tires 42 loose road contact and the pusher axles 24 are then without weight acting thereon and no longer support the truck frame and can not perform their intended function.

In further contrast with the pusher axle gas springs 44, the tag axle gas springs 216 have only a single annular elastomeric wall section 222 of exterior convex shape (see FIGS. 14 and 15) and about a 3.7-inches spring compliance or stroke that is thus about 27% (3.7/12.25) that of the pusher axle gas springs 44 and which by their arrangement with respect to the tag axle 106 and tilting about the tag axle pivot pin 150 allow up and down movement of the tag axle wheels 110 relative to the truck frame that is the same in both the up and down directions. Wherein the tag axle gas springs 216 on tilting of the tag axle when the tag axle wheels encounter bumps and depressions and potholes and also lateral or asymmetric loading on the truck frame will allow depending on which tag axle wheel 110 is affected either upward or downward movement of this wheel of about 2.3-inches corresponding to a tag axle tilt angle of 3.5-degrees before the tag axle is relieved of pressured down force and no longer helps to support the truck frame as described later. And wherein it will be understood that this allowed upward and downward movement of 2.3-inches is thus the allowed amplitude of the tag axle wheels 110 before the pressured down force is relieved.

However, it will also be appreciated that the tag axle gas springs 216 are capable of accommodating considerably more amplitude of the tag axle wheels if the tag axle was not relieved of pressured down force at the 3.5-degree tilt angle. For example, the gas springs 216 in the exemplary embodiment have a factory rated burst pressure of 300-psi and are charged at 100-psi. And if the pressured down force is not relieved on the tag axle at 3.5-degrees tilt angle as described later, one of the tag axle wheels 110 on encountering a bump about 3.3-inches high or a depression or hole about 3.3-inches deep would cause a tilt angle of 5.0-degrees that can be accommodated by the available stroke of the tag axle gas springs 216 and wherein the pressure in the tag axle gas spring then being compressed would rise to a pressure only less than half of the rated burst pressure of the gas springs. And with the pressured down force on the tag axle not relieved and should one of the tag axle wheels encounter an even higher bump such as about 4.6-inches high or a deeper depression or hole about 4.6-inches deep resulting in a tag axle tilt angle of 7.0-degrees and an companying rise in pressure in the tag axle gas spring being compressed, the tag axle gas springs 216 can accommodate this situation as well. As this is still within the available stroke of the gas springs and the increase in pressure is still far below their rated burst pressure of 300-psi.

And it will be noted at this point that the total allowed up and down movement of the tag axle wheels that can occur with the tag axle gas springs 216 is about 4.6-inches while the tag axle is pressured down and is significantly less than that allowed of the pusher axle wheels 36 and in the exemplary embodiment is thus about 38% (4.6/12.25) that of the pusher axle wheels. And this is compensated for by the primary tag axle suspension wherein the primary actuators 158 accommodate significantly more up and down tag axle wheel movement than that capable of the pusher axle wheels 36 even with the pusher axle gas springs 44 having a significantly longer stroke than the tag axle gas springs 216. Whereby the tag axle 106 will continue to support the truck frame when one or more of the pusher axles 24 with their gas spring suspension systems cannot.

For example, one or more of the pusher axles 24 may loose their load supporting ability because of the loss of the weight or reactive force acting on their gas springs 44 when the associated pusher axle tires 42 encounters a road dip exceeding 3.7-inches in depth. While the tag axle 106 will not because of the combined operation of the primary and secondary tag axle suspension in the tag axle suspension system 108.

Moreover, the arrangement of the tag axle gas springs 216 in the secondary tag axle suspension of the tag axle suspension system 108 contribute to a significant degree in aid of the other axle suspension systems in that they directly accept and support lateral forces or loading on the truck frame 16 and while absorbing shock loading incurred at the tag axle wheels 110 on encountering road depressions such as potholes thereby effectively preventing transmission of such to the truck frame as described earlier. As well as assist the other axle suspension systems in stabilizing and maintaining the truck frame at the desired substantially level attitude with respect to the road surface and with and without a payload.

It will also be appreciated that the tag axle gas springs 216 by their arrangement with respect to the centrally pivoted tag axle 106 in close proximity to the tag axle pivot pin 150 are strategically located to very efficiently support lateral loading (roll-directed or tilt loading) on the truck frame transmitted through the long suspension arms 134 to the tag axle. And it will also be appreciated that the tag axle gas springs 216 by their relatively small size and arrangement as compared to the pusher axle gas springs provide a very compact secondary tag axle suspension in the immediate vicinity of the tag axle characterized by the small space required as compared to the much larger space that would be required for gas springs like those commonly used for the pusher axles.

The tag axle gas springs 216 also have significantly smaller spring compliance than the leaf spring suspension system 26 serving the steer axle 20 but a slightly larger spring compliance compared with the leaf spring suspension system 28 serving the drive axles 22 in providing a compatible multiaxle suspension arrangement for supporting the truck frame. Wherein the leaf spring suspension systems 26 and 28, like the gas spring suspension systems 30 of the pusher axles, accept and accommodate pitching and laterally directed loading or forces on the truck frame 16 as well as road bumps and depressions and holes. And in the exemplary embodiment, the leaf spring steer axle suspension 26 has about a 5.25-inches spring compliance as limited by bump stops (not shown) to accommodate this amount of up and down movement of the steer wheels 32 relative to the truck frame. While the leaf spring drive axle suspension 28 have only about a 2.0-inches spring compliance (1.0-inches amplitude) as limited by bump stops (not shown) accommodating this small amount of conjoint up and down movement of the steer axle wheels 32 relative to the truck frame 16 but being of the walking beam type accommodate with their walking beams 43 about 10.0-inches up and down movement (5.0-inches amplitude) of either one of the drive axles 22 and its associated wheels 34 relative to the truck frame on encountering a bump or road depression or pothole.

Furthermore, the tag axle gas springs 216 with their spring compliance that is significantly less than that of the steer axle suspension 26 and pusher axle suspensions 30 but considerable more than that of the drive axle suspension 28 act to establish the tag axle 106 when deployed as a stabilizing platform similar to that of conventional truck outriggers in resisting roll (tilting) of the truck frame about the roll axis 46. Wherein it will be understood that in such comparison, such outriggers are only employed when the truck is stationary.

For example, in the case of a truck carrying a crane, such outriggers are employed to prevent the crane and the supporting truck from tipping over when the crane is working with a heavy load remote from the truck and especially where the load is either side of the truck's roll axis. The tag axle gas springs 216 operate in a similar manner in contributing to the lateral stability of the truck frame in that with the truck stationary and when one of these gas springs is loaded more than the other because of tilting forces on the truck frame 16, the other gas spring is correspondingly relieved of lateral load and the tag axle tire on this side can be pressured up to help balance the load on both of the tag axle gas springs and thus help level and stabilize the truck frame under such an imbalanced lateral load condition such as during loading of the truck body and for travel with the load to a delivery site.

In substantial contrast with respect to the steer axle and drive axle leaf spring suspension systems 26, 28 and the pusher axle gas spring suspension systems 30 and also the tag axle gas springs 216, the primary actuators 158 in providing the spring compliance in the primary tag axle suspension in the tag axle suspension system 108 allow considerably more up and down movement of the tag axle wheels 110 than that allowed of the steer axle wheels 32, drive axle wheels 34 and pusher axle wheels 36 by their respective axle suspension systems 26, 28, 30 and that allowed of the tag axle wheels 110 by the gas springs 216 in the secondary suspension of the tag axle suspension system 108.

For example, in the exemplary embodiment the primary suspension in the tag axle suspension system 108 acting through the primary actuators 158 provides a spring compliance that allows up and down movement of the tag axle 106 and thus the tag axle wheels 110 totaling about 72.0-inches (36.0-inches amplitude) with the mean determined with the truck and tag axle on a level surface. Whereas the secondary tag axle suspension acting through the tag axle gas springs 216 and while pressured down force is maintained on the tag axle as described later allows only about 4.6-inches total up and down movement (2.3-inches amplitude) of the tag axle wheels or about 0.06% (4.6/72.0) of that allowed by the primary actuators 158 on a comparative spring compliance basis in relation to total up and down tag axle wheel movement.

Whereby the tag axle suspension system 108 with the primary tag axle suspension that includes the primary actuators 158 can effectively accommodate elevation differences up to about 36.0-inches between the tag axle wheels 110 and the other axle wheels 32, 34, 36 and with the secondary suspension that includes the gas springs 216 and centrally pivoted tag axle 106 can effectively accommodate bumps about 2.3-inches high and depressions or holes about 2.3-inches deep at the individual tag axle wheels while maintaining the tag axle tires 112 in load bearing contact with the road. And wherein maximum advantage is taken of the large spring compliance provided by the primary tag axle suspension in the tag axle suspension system 108. Such as when the truck passes over a very low dip in a road. Or when the truck passes over a very high rise in a road such as in crossing over a dike or an elevated railroad crossing wherein the tag axle 106 continues to be forced to help support the truck frame under such an extreme road condition as shown in FIG. 12.

Figure 23:
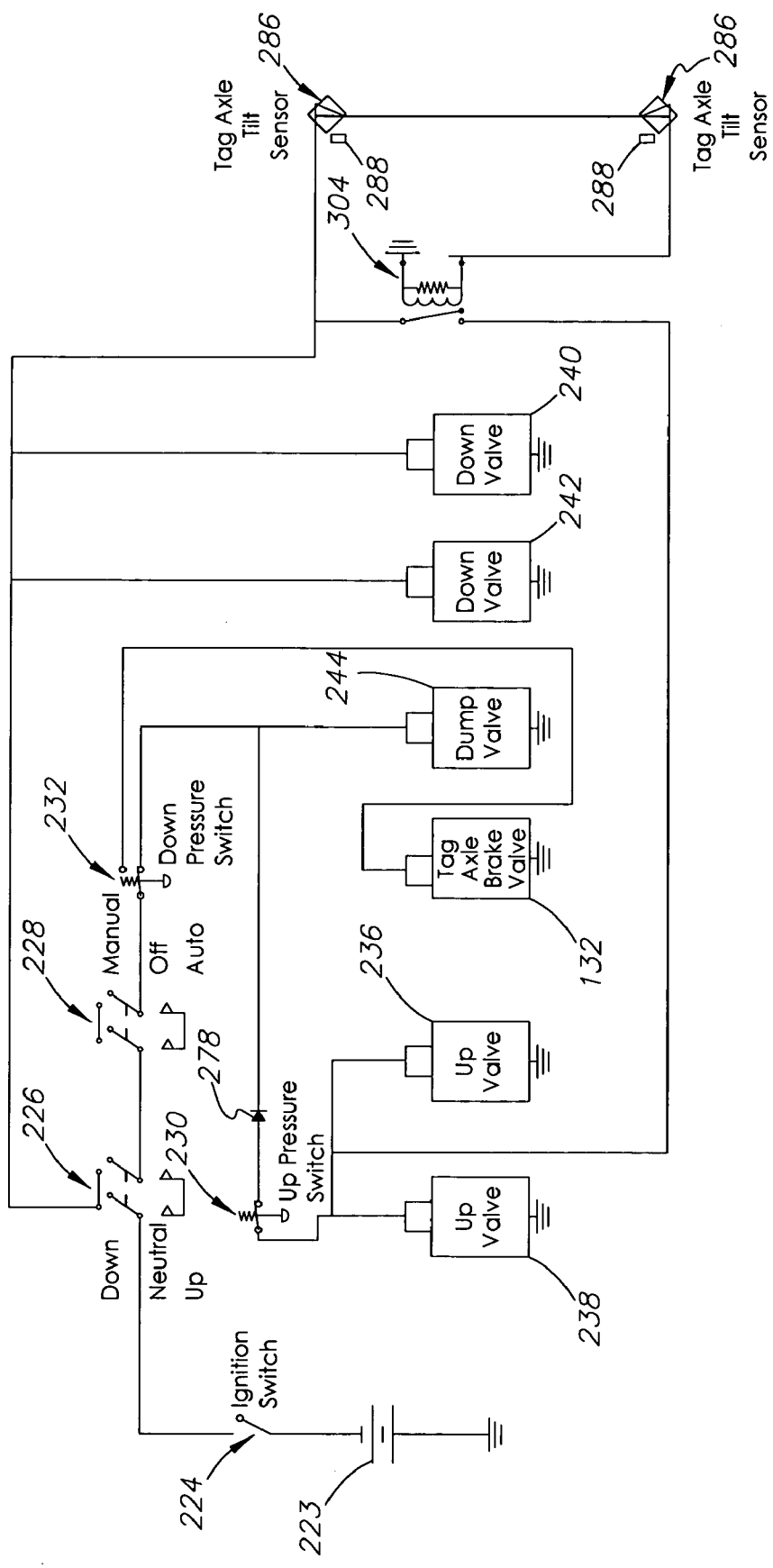
FIG. 23 is a schematic of the electrical circuitry controlling the operation of the tag axle and the tag axle wheel service brakes.
Figure 24:
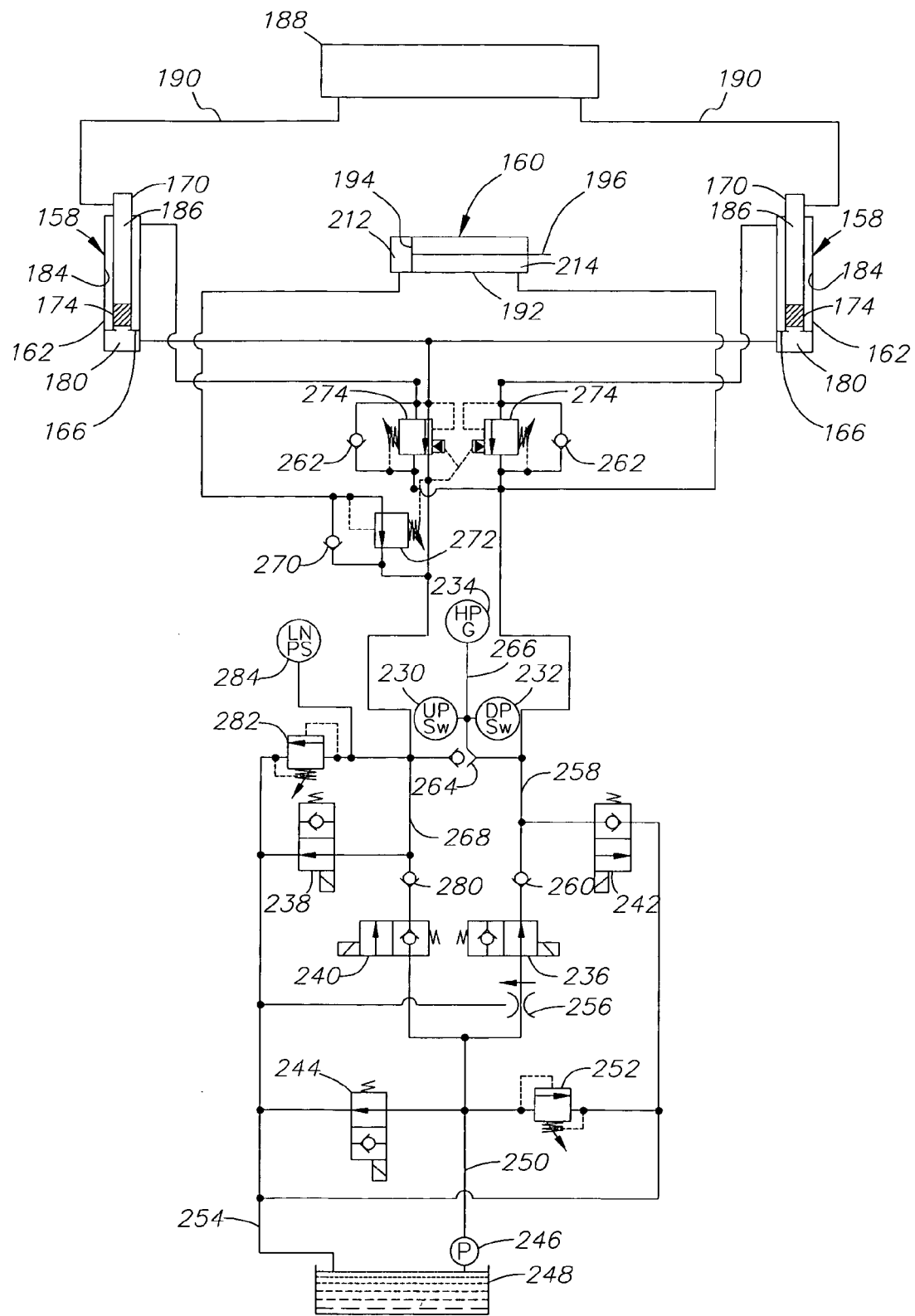
FIG. 24 is a schematic of the hydraulic fluid/gas circuitry operating the tag axle under the control of the electrical circuitry in FIG. 23 and wherein the circuitry is shown in establishing the tag axle in its raised inactive condition and stored location in FIG. 19.
Figure 25:
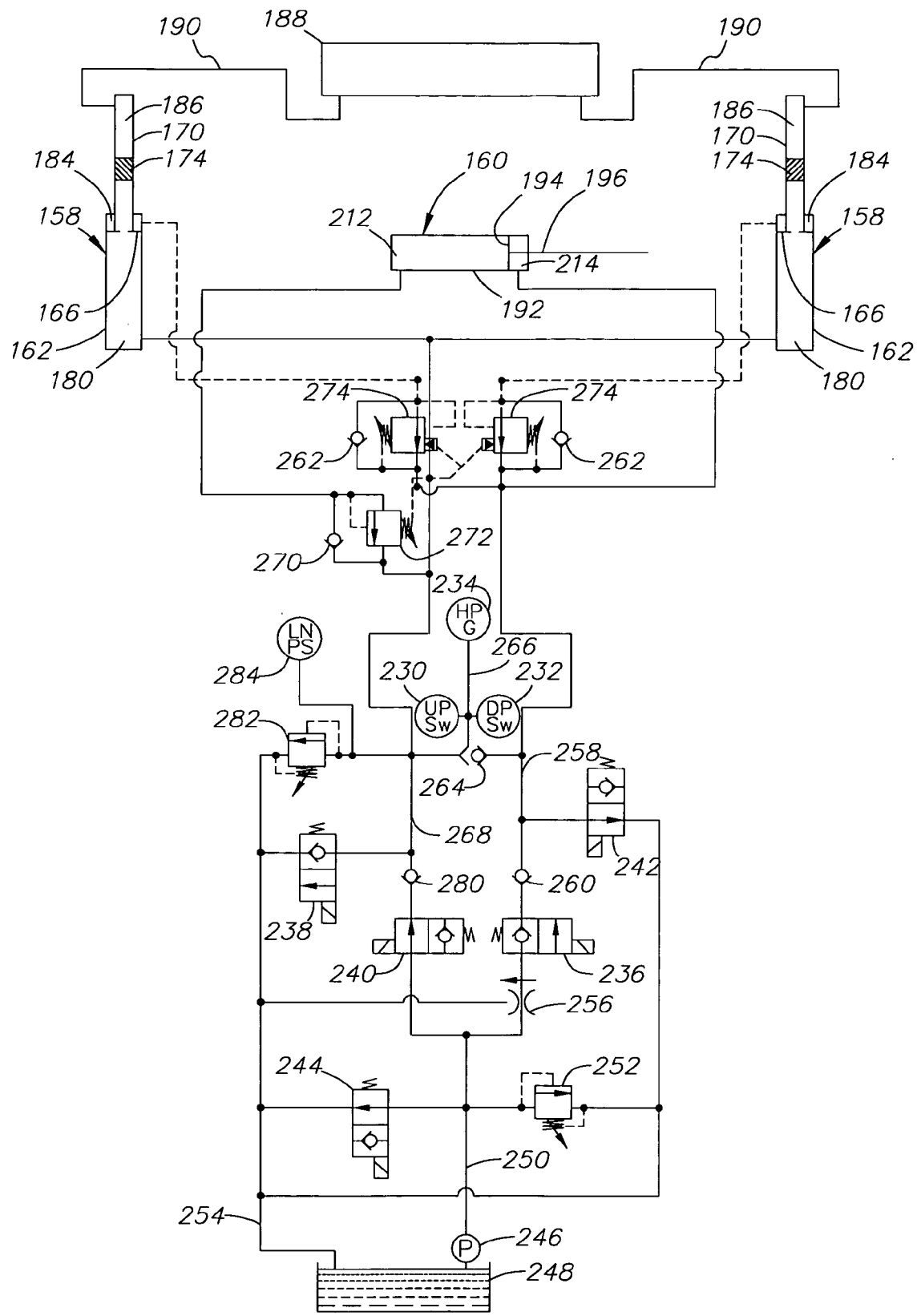
FIG. 25 shows the circuitry in FIG. 24 in establishing the tag axle in its lowered and active condition in FIG. 22.
Figure 26:
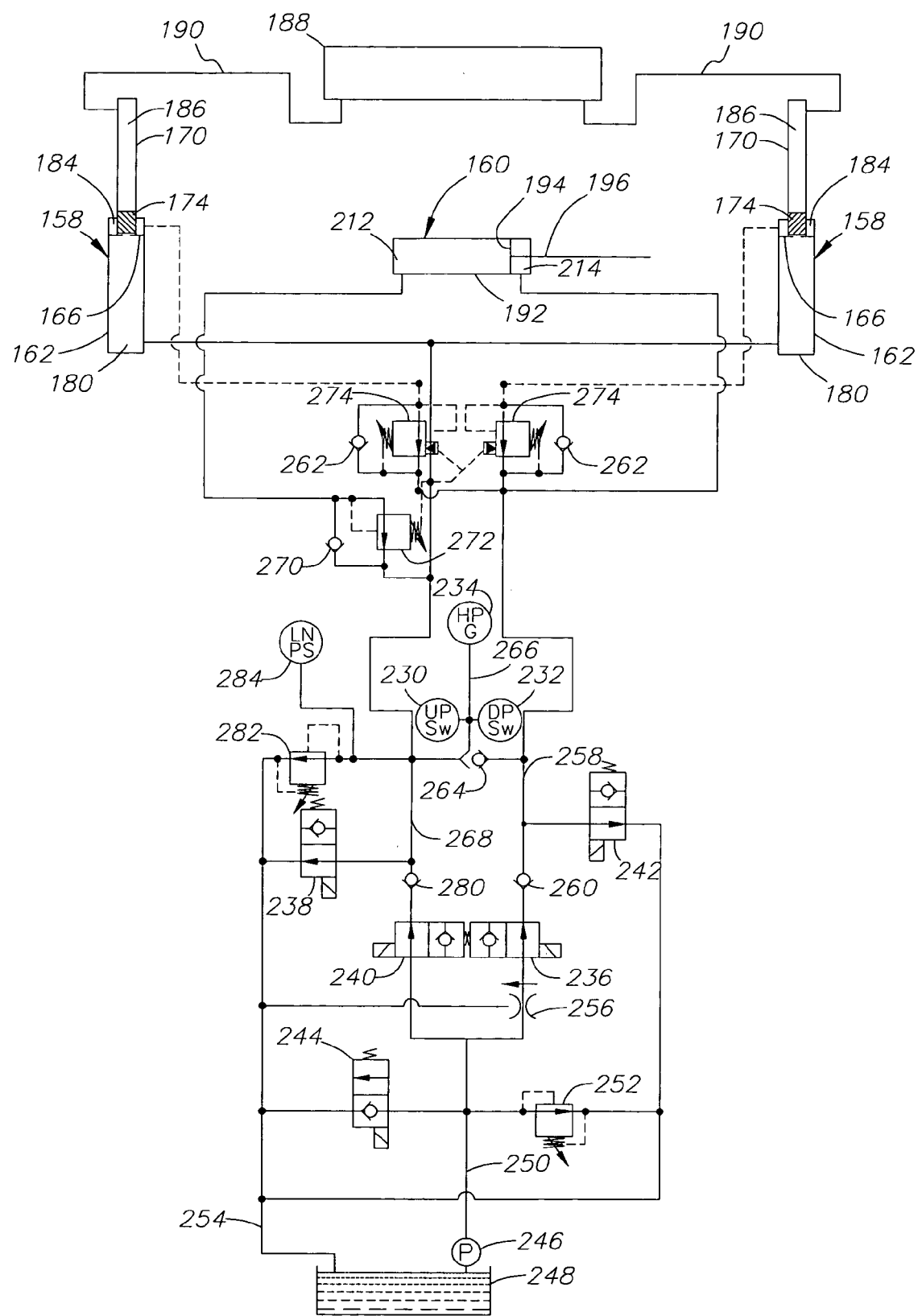
FIG. 26 shows the circuitry in FIG. 24 in establishing the relief of the down force on the tag axle while in its lowered condition.

The establishment of the tag axle 106 in the stored inactive condition and in the deployed active condition is controlled and established by a tag axle operating system comprising the electrical circuitry in FIG. 23 and the hydraulic fluid-gas circuitry in FIG. 24 where the latter is shown as conditioned in establishing the tag axle in a stored inactive condition, is shown in FIG. 25 as conditioned in establishing the tag axle in an active condition, and is shown in FIG. 26 as conditioned in establishing the tag axle in a force-relieving condition/tag axle brake-disabling condition. And to which reference will be made in further describing the tag axle operation as well as describing the circuitry.

Referring first to the electrical circuitry in FIG. 23, the circuitry includes the truck's battery 223 and Ignition Switch 224, an Up/Down Selector Switch 226, a Mode Selector Switch 228, an Up Pressure Switch 230, and a Down Pressure Switch 232. Wherein the Selector Switches 226 and 228 together with a Hydraulic Pressure Gage 234 (see FIG. 23) are located in a separate control panel (not shown) in the cab 12. And wherein the Up Pressure Switch 230, the Down Pressure Switch 232 and the Hydraulic Pressure Gage 234 are connected to receive hydraulic pressure in the hydraulic fluid/gas circuitry shown in FIGS. 24-26 where they are also labeled as "UPSw", "DPSw" and "HPG", respectively.

The Up/Down Selector Switch 226 is a manually controlled three-position switch that is moveable to and can then be locked in three positions labeled "Up", "Neutral" and "Down" in FIG. 23. The Mode Selector Switch 228 is also a manually controlled three-position switch that is moveable to three positions labeled "Manual", "Off" and "Auto" in FIG. 23 and is either momentarily positioned in the Manual position or moved and locked in either the Off position or Auto position. The Selector Switches 226 and 228 are connected in the electrical circuitry for effecting power delivery to six solenoid valves including the solenoid valve 132 which are connected in the hydraulic fluid/gas circuitry as shown in FIGS. 24-26, are hereinafter referred to as the Tag Axle Brake Valve 132, Up Valves 236 and 238, Down Valves 240 and 242, and Dump Valve 244 and are also so-labeled in FIG. 23. And wherein without power supplied to these valves, the Tag Axle Brake Valve 132, Up Valves 236 and 238, and Down Valves 240 and 242 are normally closed and the Dump Valve 244 is normally open. And wherein the contacts in the Up Pressure Switch 230 below a certain pressure are closed as shown to delivery power to the Dump Valve 244 below this pressure via the Up/Down Selector Switch 226 and the contacts in the Down Pressure Switch 232 below a certain pressure are closed with respect to the Dump Valve 244 and open with respect to the Tag Axle Brake Valve 132 as shown to thereby deliver power to the Dump Valve via the Up/Down Selector Switch 226 while preventing power delivery to the Tag Axle Brake Valve below this pressure.

Referring now to the hydraulic fluid/gas circuitry in FIGS. 24-26, this circuitry further includes a hydraulic pump 246 also labeled as "P" in these Figures that is driven by the engine 50 and draws hydraulic fluid of a suitable type from a sump 248 that is vented to atmosphere and delivers the fluid under pressure to a system main line 250. Wherein the maximum pressure is limited in the main line 250 to an acceptable or tolerable pressure by a System Pressure Relief Valve 252 that exhausts fluid from the main line 250 back to the sump via a system return line 254.

Describing first the conditioning of the tag axle 106 in its stored inactive condition in the Auto mode and with reference to FIGS. 23 and 24 and which involves raising the long suspension arms 134 and eventually pivoting the short suspension arms 140 in the same pivotal direction as the long suspension arms, the vehicle operator with the Ignition Switch 224 turned on and the engine 50 running, moves the Up/Down Selector Switch 226 from the Neutral position to the Up position and locks it in this position and moves the Mode Selector Switch 228 from the Off position to the Auto position and locks it in this position. Power is then delivered to the Up Valves 236 and 238 to open these valves. While the contacts in the Up Pressure Switch 230 are then conditioned as shown in FIG. 23 to deliver power to the Dump Valve 244 that without power is normally open as shown to thereby condition it in its closed condition until a certain prescribed pressure is reached and sensed at the Up Pressure Switch 230 as described later. Power is also then available to the Dump Valve 244 via the Down Pressure Switch 232 but as described later this switch opens to the Dump Valve before the Up Pressure Switch 230 opens to finally interrupt power to the Dump Valve in establishing the tag axle in its inactive stored condition.

Without power to the Down Valves 240 and 242, they remain closed and hydraulic fluid is delivered from the main line 250 at a constant flow rate to the Up Valve 236 by a Flow Control Valve 256 that returns excess flow to the sump 248 via the system return line 254. The fluid at a suitable constant flow rate is then delivered through the open Up Valve 236 to a delivery/return line 258 where the fluid passes through a Check Valve 260 and then directly to the chamber 214 in the toggle cylinder 160. And wherein in the exemplary embodiment, the Flow Control Valve 256 is set to regulate the flow delivery rate to about three to five gallons per minute (3-5 gpm).

Fluid after passing through the Check Valve 260 also passes through second Check Valves 262 in parallel branches of the delivery/return line 258 and then directly to the hydraulic chamber 184 in the primary actuators 158 where the fluid pressure acts on the primary actuator pistons 166. With fluid passing through the Check Valve 260 also delivered by a Shuttle Valve 264 to a signal line 266 that is connected to both the Up Pressure Switch 230 in the electrical circuit and the Hydraulic Pressure Gage 234 in the cab 12.

The other hydraulic chamber 180 in the primary actuators 158 are then open to the sump 248 via the other open Up Valve 238, a delivery/return line 268 and the system return line 254. Fluid remaining in the chambers 180 from tag axle lowering operation as described later is thus exhausted as the primary actuator piston rods 170 are forced by the respective pistons 166 to retract by the hydraulic fluid being supplied under pressure via the delivery/return line 258 to the other primary actuator hydraulic chambers 184. Whereby the tag axle 106 is raised by the long suspension arms 134 from its fully lowered position through an intermediate position shown in FIGS. 16 and 17 and then to the position shown in FIG. 18 on full retraction of the primary actuator piston rods 170 (see FIG. 24) and wherein the long suspension arms 134 are then upright and the toggle cylinder 160 has not yet toggled the tag axle 106 into its stored location.

During the tag axle lifting operation with the long suspension arms 134, the gas pressure in the primary actuator gas chambers 186 acts on the primary actuator accumulator pistons 174 and with the long suspension arms 134 in their upright position and the primary actuator piston rods 170 fully retracted with the hydraulic pressure in chambers 184 exhausted, the accumulator pistons are forced by the initial charging pressure in the gas circuit to be positioned with their hydraulic fluid exposed face bottomed on the respective primary actuator hydraulic pistons 166 as shown in FIG. 24.

The other chamber 212 of the toggle cylinder 160 during the raising of the long suspension arms 134 is blocked from the open Up Valve 238 via the delivery/return line 268 by a Check Valve 270 and a pilot-controlled Flow Relief Valve 272 which are connected in parallel between the hydraulic chamber 212 and the delivery/return line 268. The Flow Relief Valve 272 receives its pilot pressure signal from the delivery/return line 268 that is then open to the vented sump 248 via the open Up Valve 238. And without its pilot pressure signal, the Flow Relief Valve 272 is normally closed and is set to open as shown in FIG. 24 at a predetermined pressure at the toggle cylinder hydraulic chamber 212 and thereby establish its connection with the sump 248 via the open Up Valve 238 and only then allow the toggle cylinder piston rod 196 to retract by the fluid under pressure being supplied to the other toggle cylinder hydraulic chamber 214. With this occurring when the primary actuator piston rods 170 are fully retracted and locating the long suspension arms 134 in their upright position while the pressure in the toggle cylinder chamber 214 as well as in the primary actuator chambers 184 rises to the full pressure available in the delivery/return line 258 and urges retraction of the toggle cylinder piston rod 196 while the other toggle cylinder chamber 212 is then still blocked from the other delivery/return 268 by the Flow Relief Valve 272.

In the exemplary embodiment, the Flow Relief Valve 272 is set to open without its pilot pressure signal at about 875-psi to open the toggle cylinder chamber 212 to the delivery/return line 268 to only then allow the pressure acting in the other toggle cylinder chamber 214 to retract the toggle cylinder piston rod 196 and toggle the tag axle 106 into its stored location over the rear end of the truck body as shown in FIGS. 19 and 20. Wherein the long suspension arms 134 remain in their upright position and the short suspension arms 140 have been forced by the toggle cylinder linkage 161 with the toggle cylinder piston rod 196 to swing or toggle the tag axle on the short suspension arms 140 into its stored location. And with the Flow Relief Valve 272 thus delaying the retraction of the toggle cylinder piston rod 196 in a sequencing manner until the long suspension arms 134 are upright before toggling the tag axle 106 into its stored location and into a folded-in relationship to the upright long suspension arms 134 and over the truck body. And wherein this folded-in relationship of the tag axle in the stored location minimizes the height of the tag axle wheels 110 above the truck body and the pressure in the toggle cylinder chamber 214 and primary actuator hydraulic chambers 184 are at the full pressure available in the delivery/return line 258.

The Down Pressure Switch 232 is exposed to the pressure in the delivery/return line 158 during the raising of the tag axle but is set to open in respect to the Dump Valve 244 to interrupt power thereto at a certain predetermined pressure for conditioning the tag axle in its lowered active condition as described in more detail later. And the Up Pressure Switch 230 is set to operate at a significantly higher predetermined pressure in the delivery/return line 258 to thus open to the Dump Valve 244 and interrupt power thereto after the Down Pressure Switch 232 has interrupted power thereto and thereby finally interrupt power to the Dump Valve 244. And without power, the Dump Valve 244 is caused to open as shown in FIG. 24 and thereby connect the system main line 250 to the sump 248 via the system return line 254 and thereby bypass discharge from the pump directly back to the sump to relieve the pump of unnecessary duty. And when this bypass flow by the Dump Valve 244 occurs, the pressure in the system main line 250 drops and the Check Valve 260 in the delivery/return line 258 then prevents backflow through the open Up Valve 230 with the open Dump Valve. And wherein this bypass flow is free of restriction by pilot-operated primary actuator Load Locking Valves 274 that are connected in parallel with the Check Valves 262 between the respective primary actuator hydraulic chambers 184 and the delivery/return line 258 and perform no function in the raising of the tag axle.

In the exemplary embodiment, the Up Pressure Switch 230 is set to finally interrupt power to the Dump Valve 244 and thus effect opening this valve for bypass flow at a pressure of about 2,000-psi in the delivery/return 258 with this occurring when the primary actuator piston rods 170 and the toggle cylinder piston rod 196 are fully retracted and the pressure on their pistons then increases to this pressure. And this pressure at 2,000-psi as determined by the Up Pressure Switch 230 is then trapped in the primary actuator hydraulic chambers 184 by the Check Valve 260 thereby locking the primary actuators piston rods 170 in their fully retracted condition. And wherein this pressure of 2,000-psi is also trapped in the toggle cylinder chamber 214 by the Check Valve 260 while the Flow Relief Valve 272 has then closed and traps the 875-psi pressure in the other toggle cylinder chamber 212 against the higher and opposing pressure of 2,000-psi thereby locking the toggle cylinder piston rod 196 with the pressure differential (2,000-psi minus 875-psi or 1,125-psi) in its fully retracted condition as shown in FIG. 24. And with these pressure-locking conditions, the tag axe 106 is thereby locked in its stored inactive condition above the end of the truck body and with the tag axle brakes disabled in that with the Up/Down Selector Switch 226 in the Up position, power is not available to the Tag Axle Brake Valve 132 so it remains normally closed preventing air pressure supply to the tag axle brakes 114.

Describing now the conditioning of the tag axle 84 in its lowered and active condition and with reference to FIGS. 23 and 25 and starting with the tag axle 106 in its raised and stored inactive condition as described above, the vehicle operator moves the Up/Down Selector Switch 226 from the Up position through the Neutral position to the Down position and locks it in this position while leaving the Mode Selector Switch 228 in the Auto position. Thereby delivering power to the Down Valves 240 and 242 to open these valves as shown in FIG. 25 while the Up Valves 236 and 238 are then without power and thus closed as shown.

The contacts in the Down Pressure Switch 232 are conditioned to deliver power to the Dump Valve 244 to close this valve until a certain prescribed pressure is reached and not deliver power to the Tag Axle Brake Valve 132 so that this valve remains closed to disable the tag axle brakes 114 until this prescribed pressure is reached. And with delivery of power to the Dump Valve 244 via the Down Pressure Switch 232, power is prevented by a diode 278 from reaching the Up Valves 236 and 238 via the normally closed Up Pressure Switch 230 so that they remain closed.

Hydraulic fluid from the pump 246 then passes from the main line 250 through the open Down Valve 240 to the delivery/return line 268 where it passes through a Check Valve 280 and then through the Check Valve 270 to the toggle cylinder chamber 212 where pressure has been contained at 875-psi by the Flow Relief Valve 272 with the tag axle in the inactive condition. While fluid passing through the check valve 280 is also delivered to the primary actuator hydraulic chambers 180 and via the Shuttle Valve 264 to the signal line 266 and thus to the Down Pressure Switch 232 and the Hydraulic Pressure Gage 234. While the other open Down Valve 242 then connects the other delivery/return line 258 to the system return line 254 and thereby connects the other toggle cylinder chamber 214 to the sump 248 to thus exhaust this chamber.

The fluid delivery to the primary actuator hydraulic chambers 180 forces their respective piston rods 170 to start extending and thereby lower the long suspension arms 134 from their upright position while the fluid delivery to the toggle cylinder chamber 212 starts forcing the toggle cylinder piston rod 196 to extend and acting through the toggle linkage 161 swing the tag axle 106 on the short suspension arms 140 relative to the long suspension arms 134 in an unfolding direction opposite that in locating the tag axle in its stored location. The Flow Relief Valve 272 now receives a piloting pressure from the delivery/return line 268 and wherein this valve is set to close when the pressure reaches about 500-psi in the toggle cylinder chamber 212 and with such valve closure and together with the check valve 270 traps this pressure in the chamber 212 so that it remains throughout the lowering of the tag axle with the fluid pressure being supplied to the primary actuator chambers 180.

The Load Locking Valves 274 also receive a piloting pressure from the delivery/return line 268 and at about 1,700-psi they are set to close and together with the respective Check Valves 262 trap this pressure in the primary actuator chambers 184 throughout the lowering of the tag axle with the fluid being supplied to the other primary actuator chambers 180 by the delivery/return line 268. Whereby with continued lowering of the tag axle, the toggle cylinder piston rod 196 with the 500-psi in its chamber 212 is fully extended thereby unfolding the tag axle 106 with respect to the long suspension arms 134 with toggling action of the toggle linkage 161 when these arms reach an angle of about 30-degrees from horizontal as shown in FIG. 21 and thus prior to these arms and thereby the tag axle reaching their fully lowered position shown in FIG. 22. And wherein the toggle linkage 161 has been established in its over-center condition to accept the resulting loading placed on the tag axle with the tag axle tires being forced to bear against the road surface.

The initial charge pressure of the nitrogen in the exemplary embodiment is such that the pressure in the primary actuator gas chambers 186 is then at a certain pressure and acts on the respective accumulator pistons 174 as the tag axle tires 112 are forced against the road by the pressure building in the delivery/return line 268 to the primary actuator chambers 180. With this hydraulic pressure thus being in opposition to the nitrogen pressure also acting on the accumulator pistons.

Figure 8:
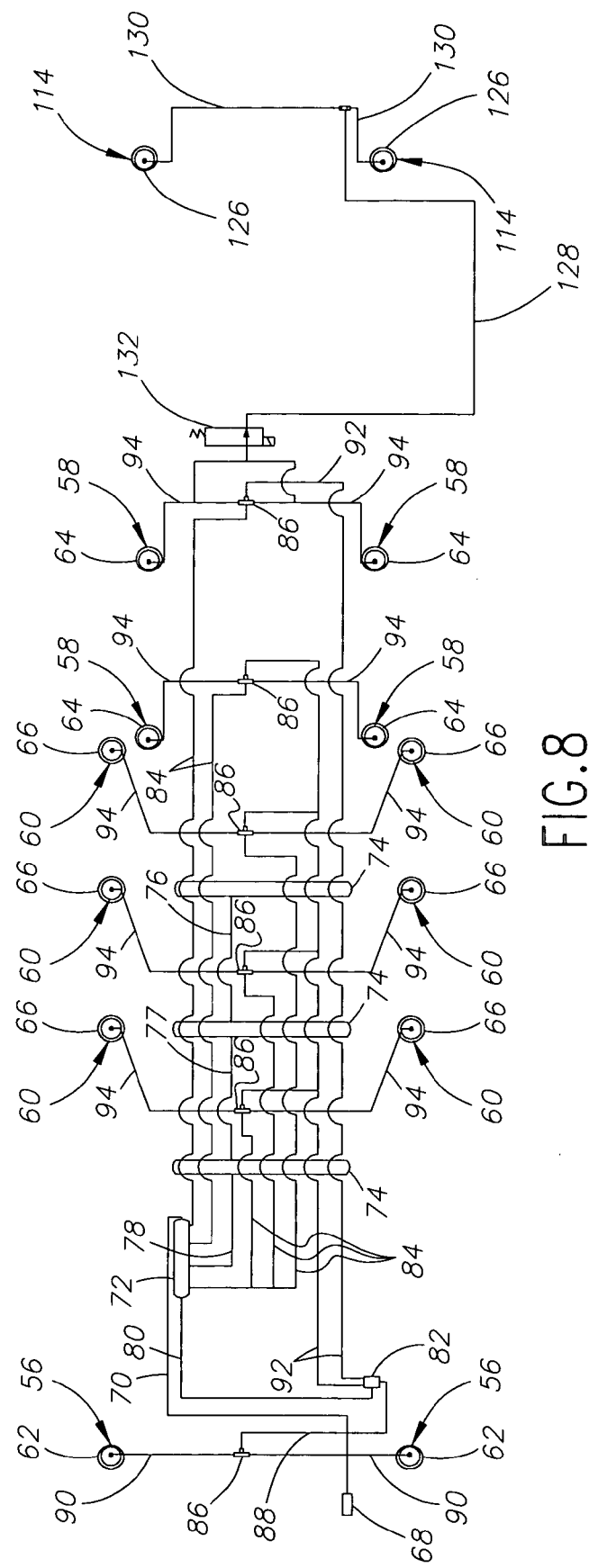
FIG. 8 is a schematic of the truck's air brake system for the service brakes.

The Down Pressure Switch 232 is exposed to the hydraulic pressure in the delivery/return line 268 and is set at a certain prescribed pressure in this line to interrupt the power to the Dump Valve 244 to thus open this valve as shown and thereby establish this pressure as the operating or working pressure in the delivery/return 268 and at the same time deliver power to the Tag Axle Brake Valve 132 to open this valve as shown in FIG. 8 and enable the operation of the tag axle brakes 114. And wherein with the Dump Valve 244 open, fluid is bypassed to the sump dropping the pressure in the system main line 250 like in the establishment of the tag axle in the inactive condition but in this case with the Down Valve 240 open and with the Check Valve 280 then preventing backflow through this open Down Valve to contain this working pressure in the delivery/return line 268.

In the exemplary embodiment, the Down Pressure Switch 232 is set to interrupt power to the Dump Valve 244 to open this valve and to deliver power to the Tag Axle Brake Valve 132 to open this valve and enable the tag axle brakes 114 when the hydraulic pressure in the delivery/return line 268 and thus acting in the hydraulic chambers 180 on the respective hydraulic pistons 166 and also on the respective accumulator pistons 174 reaches about 1,525-psi as the prescribed operating or working pressure. And for establishing the tag axle 106 in its active condition, the gas portion of the hydraulic fluid/gas circuitry is initially charged with nitrogen at a pressure that is about 85-87 percent of the desired operating or working pressure in the delivery/return line 268 and thus for example at the low end of this range is about 1,300-psi. With the nitrogen charging being accomplished in setting up the gas portion of the system by moving the Mode Selector Switch 228 to the Off position and then moving the Up/Down Selector Switch 226 to the Up position for the nitrogen charging to occur. And wherein the nitrogen pressure can also be checked later and recharged if necessary by following the same control switch procedure.

With the truck on a level surface as shown in FIGS. 1 and 22, the tag axle 106 is fully forced or pressured down after its tires 112 contact the supporting surface and the pressure in the delivery/return line 268 reaches the prescribed working pressure of 1,525-psi. Wherein the long suspension arms 134 are then substantially parallel to the road and substantially level with the truck frame, the pivot axis of the tag axle 106 is also substantially parallel to the road, and both the primary actuator hydraulic pistons 166 and accumulator pistons 174 are then in their mean operating position as shown in FIGS. 6 and 25. And wherein with respect to the primary suspension of the tag axle, the operating pressure in the delivery/return line 268 and thus available to the chamber 180 of the primary actuators 158 is 1,525-psi and wherein the pressure in the other hydraulic chambers 184 is limited by the pilot-operated Load Locking Valves 274 and 274 to 1,700-psi by piloting pressure received from the delivery/return line 268 to hydraulically force balance the primary actuator hydraulic pistons 166 in their mean position and thereby their respective piston rods 170. Noting that the face of the hydraulic pistons 166 exposed to the respective hydraulic chambers 184 is slightly smaller in area than their face exposed to the other hydraulic chambers 180 and with the difference in pressure of about 175-psi between the higher pressure of 1,700-psi in chambers 184 and the lower operating pressure of 1,525-psi in chambers providing for such hydraulic force balance on the pistons 166.

The hydraulic pressure in the delivery/return line 268 in reaching the operating pressure of 1,525-psi as determined by operation of the Down Pressure Switch 232 over comes the opposing nitrogen pressure of 1,300-psi on the accumulator pistons 174. And thereby forces movement of the accumulator pistons 174 from their bottomed position on the respective hydraulic pistons 166 shown in FIG. 24 with the long suspension arms 134 upright to their mean position shown in FIG. 25 and thereby compressing the nitrogen gas that was initially at a pressure of 1,300-psi to a significantly higher pressure. And wherein the mean position of the accumulator pistons 166 occurs where the working hydraulic pressure of 1,525-psi is balanced or offset by the forced increase of nitrogen pressure that is then also at the same pressure in providing the balanced pressure on the accumulator pistons as shown in FIG. 25.

In the active condition in the exemplary embodiment with the prescribed working pressure of 1,525-psi, the tag axle is forced to accept a load of about 12,000-pounds that is about 1,200-pounds less than the 13,200-pounds rated load capacity of the tag axle. And it will be understood that the load placed on the tag axle can be increased but preferably still below the rated load capacity of the tag axle by increasing the working pressure by setting the Down Pressure Switch 232 to operate as before but at a higher pressure.

With the tag axle thus established in the active condition and with the truck on a level road surface and the primary actuator hydraulic pistons 166 and accumulator pistons 174 in their mean operating positions, the primary actuators 158 operate with both hydraulic pressure and gas pressure to allow the tag axle 106 to raise and lower to the large degree described above by pivoting of the long suspension arms 134 coupled with gas spring action acting through the accumulator pistons. Wherein the pilot operated Load Locking Valves 274 open the primary actuator chambers 184 to the delivery/return line 268 when the pressure in the other primary actuator chambers 180 reaches a predetermined pressure in allowing the gas spring operation and which in the exemplary embodiment is set to occur when the hydraulic pressure reaches about 800-psi to 1,000-psi in the latter chambers. While the nitrogen being compressible acts to maintain the operating pressure as the tag axle is forced to rise and lower.

For example, the primary actuator piston rods 170 will move inward in respect to their cylinder 162 and then return outward to their mean position with gas spring action when the tag axle wheels 110 pass over a bump on the supporting surface and will move outward in respect to their cylinder and return inward to their mean position with gas spring action when the tag axle wheels pass through a dip in the supporting surface. And wherein the piloted Load Locking Valves 274 operate as described above should the pressure reach about 800-psi to 1,100-psi in the primary actuator chambers 180 to allow this suspension action. And with the same operation in play regardless of the height of the bump or depth of the dip up to the limits of the up and down movement allowed of the tag axle which as earlier described is about a 36.00-inches amplitude and includes the ability to traverse a significantly raised section such as when passing over an elevated train crossing as shown in FIG. 12 with the tag axle continuing to accept its prescribed load.

In further regard to the raising of the tag axle under load and on encountering an unusually high portion of the supporting surface where the tag axle 106 attempts to raise higher than about 36.00-inches in negotiating such an unusually high portion thereby forcing the primary actuator piston rods 170 into their cylinders 116 an unusual distance, a High Pressure Relief valve 282 opens at a predetermined pressure connecting the delivery/return line 268 to the system return line 254 to thereby limit the operating or working pressure in the delivery/return line 268 to a suitable level still within the load capability of the tag axle. In the exemplary embodiment, the High Pressure Relief valve 282 is set to open at about 1,950-psi or about 425-psi above the operating pressure of about 1,525-psi to thus limit the maximum down force that can act on the tag axle under such a circumstance and is still within the maximum load capability of the particular tag axle construction. The High Pressure Relief Valve 282 also provides an additional function in that it will open at this pressure setting to guard the tag axle operating system and the truck frame from hydraulic pressure spikes that can result from the tag axle wheels encountering for example severe potholes and extremely rough railway crossings.

In addition, a Low Nitrogen Pressure Switch 284 also labeled as "LNPS" is connected to the delivery/return line 268 and operates to alert the vehicle operator with both sound and visual alarms (not shown) located in the cab 12. For example, in the event that the nitrogen pressure in the gas circuitry is lost for some reason, the hydraulically pressured accumulator pistons 174 in the primary actuators 158 on the loss of the nitrogen pressure will bottom with significant impact at the closed end of their respective bores 172 in the primary actuator piston rods 170 causing a pressure spike in the hydraulic fluid pressure in the delivery/return line 268. And in the exemplary embodiment, the Low Nitrogen Pressure Switch 284 is normally open and set to operate at a pressure of about 1,850-psi or about 100-psi below the setting of the High Pressure Relief Valve 282 and on sensing such a pressure spike as being indicative of low nitrogen pressure then closes in a releasable locked condition and triggers the sound and visual alarms indicating low nitrogen pressure to the vehicle operator. Thereby giving the operator reason to place the tag axle in its stored inactive condition until this situation is remedied.

Having described the operation with the Up/Down Selector Switch 226 in the Down position and the Mode Selector Switch 228 in the Auto position, the truck operator can adjust the down force on the tag axle during its lowering so as to accept less load than that provided in the Auto mode as for example when there is no payload or only a partial one. This is accomplished by the operator placing the Up/Down Selector Switch 226 in the Down position and moving the Mode Selector Switch 228 from the Off position to the Manual position while monitoring the Hydraulic Pressure Gage 234. The Dump Valve 244 is then closed and when the pressure indicated on the Hydraulic Pressure Gage 234 reaches a pressure deemed sufficient to load the tag axle under the circumstances and which will be less than that in the Auto mode, the operator then releases the Mode Selector Switch 228 that then automatically returns to the Off position whereby power is interrupted to the Dump Valve 244 thus opening this valve and with the selected operating pressure maintained in the delivery/return line 268 by the Check Valve 280 with the Down Valve 240 open. And wherein this lesser operating pressure (less than the 1,525-psi in the Auto mode) thus applies less down force on the tag axle than in the Auto mode as determined by the truck operator.

It will also be appreciated from the above-described operation of the Mode Selector Switch 228, that the tag axle 106 cannot be raised or lowered with the Mode Selector Switch in the Off position. Regardless of whether the Up/Down Selector Switch 226 is in the Up position or the Down position because the Dump Valve 244 is then without power and is thus open preventing pressure buildup in either the supply/delivery line 258 or 268.

In the Auto mode and with respect to tag axle brake operation, the Down Pressure Switch 232 delivers power to open the Tag Axle Brake Valve 132 and enable the tag axle service brakes 114 only when a certain pressure is reached in the delivery/return line 268 and thus indicating the tag axle is in its normally forced active condition helping to support the truck frame. And in the exemplary embodiment this occurs with a working pressure of about 1,525-psi in the delivery/return line 268 as described earlier. As a result and in the event the vehicle operator deploys the tag axle while driving along a road and the tag axle is not yet fully established in its active condition with the 1,525-psi working pressure and should the operator in the interim then have to apply the vehicle brakes for some reason such as on encountering a stop light, stop sign and interfering traffic, the tag axle service brakes 114 are not yet enabled. And thus the tag axle wheels will be in a free wheel mode when their tires contact with the road to thereby help prevent these tires from being flat spotted in such a situation.

Enabling and disabling of the tag axle service brakes 114 and also relieving the pressure and thus the down force applied to the tag axle but without raising the tag axle 106 is provided under certain circumstances by operation of two like proximity switches 286 of the magnetically operated type referred to as magnetic proximity sensors which are operatively associated with the tag axle 106 and located on opposite sides of the tag axle pivot pin 150 between this pivot and the near tag axle wheel 110. The proximity switches 286 have normally closed contacts that break contact or open when the switches come into close proximity to an associated magnet 288 that thus serves as a switch operator to break contact or open the switch. With the proximity switches also referred to herein to as Tag Axle Tilt Sensors and also so labeled in FIG. 23.

Figure 27:
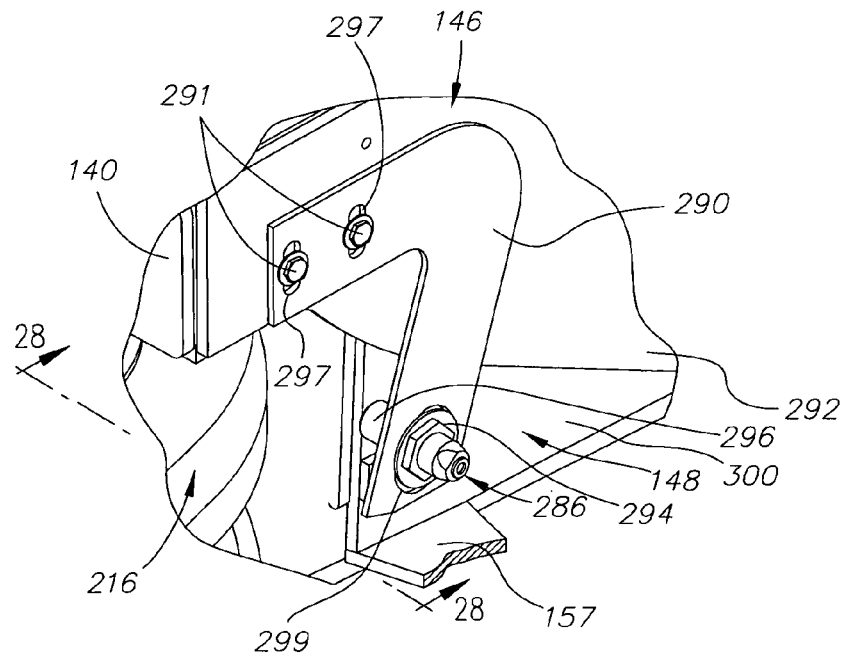
FIG. 27 is an enlarged view of the encircled portion labeled "FIG. 27" in FIG. 3.
Figure 28:
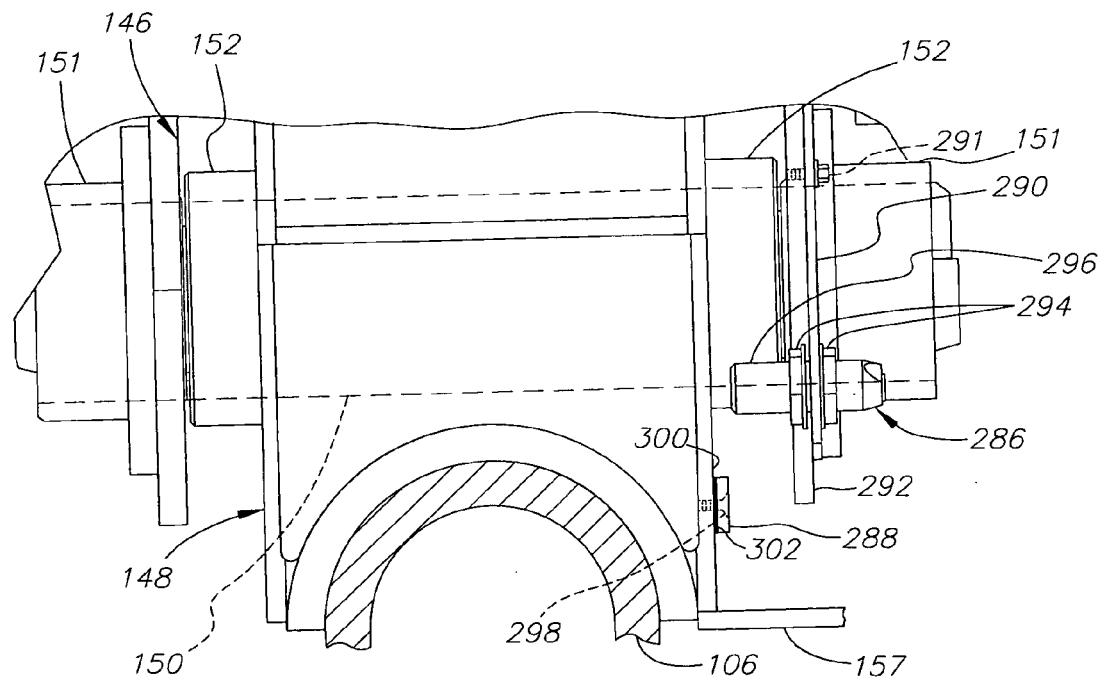
FIG. 28 is an enlarged view taken along the lines 28-28 in FIG. 27 when looking in the direction of the arrows and with the gas spring omitted.

Referring to FIGS. 4, 27 and 28, the proximity switches 286 and their respective magnets 288 are located between the respective tag axle gas springs 216 and the tag axle pivot pin 150 respectively. Wherein the proximity switches 286 are supported on the tag axle carriage 146 with a support arm 290 that is fixed with a pair of bolts 291 to the rear side 292 of the carriage directly above the respective arms 157 for the coil spring/shock absorber assemblies 123 which are fixed to this side. The proximity switches 286 extend through the respective support arms support arms 290 and have an externally threaded portion whereby they are fastened in place with washers and nuts 294 on opposite sides of the arms such that a cylindrical portion 296 of the switch enclosing the magnetically operated switch contacts is arranged for exposure to the respective magnets 288. And wherein the nuts 294 also provide for fine adjustment of the face-to-face spacing between the cylindrical portion 296 and the respective magnet 288 to effect switch operation. And wherein side-to-side adjustment between the cylindrical portion 296 of the proximity switches 286 and their respective magnets 288 in the path of travel of the proximity switches is also provided by slots 297 in the arms 290 that receive the bolts 291. And wherein adjustment with respect to the travel of the proximity switches 286 is also provided by slots 299 in the arms 290 that receive the cylindrical portion 296 of the proximity switches 286. See FIGS. 28 and 30.

The magnets 288 have a rectangular shape and are fixed by a single, non-magnetic stainless-steel taper-headed bolt 298 to the rear side 300 of the tag axle trunnion body 148. Wherein the head of the bolts 298 is flush with the face of the magnets and a thin cushion 302 in the form of double-sided tape about 0.075-inches thick is sandwiched between the magnets 288 and the side 300 of the trunnion body 148 to cushion the magnets during their securing to prevent their fracture on tightening of their fastening bolt 298. With the double-sided tape 302 providing an addition function in that it allows the use of only a single fastener in retaining each magnet in a desired attitude with respect to the path of travel of the proximity switches which has the short dimension of the rectangular-shaped magnets extending along this path and their long dimension or width extending transverse of this path to provide a relatively limited magnetic force field for the size of the magnet in this direction for tripping the proximity switches.

The magnets 288 are located on the trunnion carriage 146 so as to lie in the path of travel of the respective proximity switches 286 with tilting movement of the tag axle about the tag axle pivot pin 150 as later described. And to this end, the proximity switches 286 and their respective operating magnets 288 are located at like distances from and close to the tag axle pivot pin 150 so that the degree of tilting or pivotal movement about the tag axle pivot pin required to effect switching operation by their associated magnets is thereby minimized. And wherein certain prescribed tilting of the tag axle about the pivot pin 150 in one direction brings one of the proximity switches 286 in close proximity to its associated magnet 288 to break (open) contact in the switch and tilting of the tag axle in the opposite direction to the same degree operates the other proximity switch in like manner.

As shown in FIG. 23 and with the tag axle 106 in its active condition and in a level attitude with the road surface, the contacts in the proximity switches 286 are closed and complete a circuit from the Control Switch 226 while in the Down position to a relay 304 to hold the relay contacts open and thereby open a circuit from the battery 223 to the Up Valves 236 and 238 to prevent power thereto so that the pressured down force is maintained on the tag axle and the Tag Axle Brake Valve 132 remains open as shown in FIG. 8 to make air pressure available to apply the tag axle service brakes 114. But when the contacts in either of the proximity switches 286 are broken, the relay 304 is no longer powered and its contacts close to then deliver power to both the Up Valves 236 and 238 to open these valves while the Down Valves 240 and 242 are open to thereby relieve the hydraulic-gas pressure produced force on the tag axle 106 but without raising the tag axle 106 by operation of the primary actuators 158.

This condition being shown in FIG. 26 and wherein the delivery/return line 268 is then connected by the Up Valve 238 to the system return line 254 and thus exhausting the working pressure that existed in the delivery/return line 268 and thus while the other delivery/return 258 is also connected to the system return line. Whereby the pressured down force on the tag axle 106 is relieved with the absence of the working pressure while the toggle cylinder 160 with the 500-psi pressure locked in the chamber 212 continues to hold the tag axle in position relative to the long suspension arms 134 and the Down Pressure Switch 232 without the working pressure then operates to interrupt power to the Tag Axle Brake Valve 132 thus closing this valve and disabling the tag axle brakes 114. And wherein the tag axle 106 is not raised with the loss of working pressure with the opening of the Up Valves 236 and 238 while the Down Valves 240 and 242 are open. And without the hydraulic-gas pressure produced force, the tag axle 106 no longer helps to the support the truck frame 16 and the tag axle wheels 110 then only bear the dead weight of the tag axle assembly with the tag axle tires 112 remaining in contact with the road. And without the working pressure in the delivery/return line 268 and thus in the primary actuator chambers 180, the accumulator pistons 174 are forced by the nitrogen pressure to bottom on and be contained by the respective primary actuator pistons 166 as shown in FIG. 26.

Moreover, with the loss of working pressure in the delivery/return line 268, the Down Pressure Switch 232 then delivers power to the Dump Valve 244 and thus closing this valve as shown in FIG. 26. Whereby the Dump Valve 244 is in a ready condition to provide for rapid reestablishment of the working pressure in the delivery/return line 268 should the proximity switch that was opened be reestablished in its closed condition and thereby interrupt power to the Up Valves 236 and 238 to close these valves to thereby effect restoration of the tag axle in its active condition.

For performing the desired action of relieving the down force on the tag axle 106 and disabling the tag axle wheel service brakes 114 under circumstances as described later, the proximity switches 286 and their respective operating magnets 288 are located relative to each in like manner with the magnets positioned below and distant from their respective switches 286 when the tag axle 106 is in a normal level attitude (horizontal to the road). Wherein the magnets 288 are then sufficiently distant from their respective proximity switches 286 as to not open or break their contacts and thus maintain the relay 294 open. See FIGS. 28-30.

In the exemplary embodiment, the relative locations of the proximity switches 286 and their magnets 288 are set so that when the tag axle 106 tilts or swings from its normal level position in either direction through an angle of 3.5-degrees that as earlier described translates to 2.3-inches of downward movement of one of the tag axle wheels 110 and the same amount of upward movement of the other tag axle wheel, the contacts in one of the proximity switches will be broken by its then close proximity to its operating magnet thus closing the relay 304 and delivering power to the Up Valves 236 and 238 to relieve the pressured down force on the tag axle and thereby disable the tag axle wheel service brakes through opening of the Down Pressure Switch 182 in relation to the Tag Axle Brake Valve 132. And wherein this allowed up and down tag axle wheel amplitude of 2.3-inches before one of the proximity switches 286 is tripped is determined to be less than the radial dimension of the tag axle tires 112 outward of the tag axle wheels 110 to prevent damage to these wheels in the event one of these tires deflates as described in more detail later.

Figure 29:
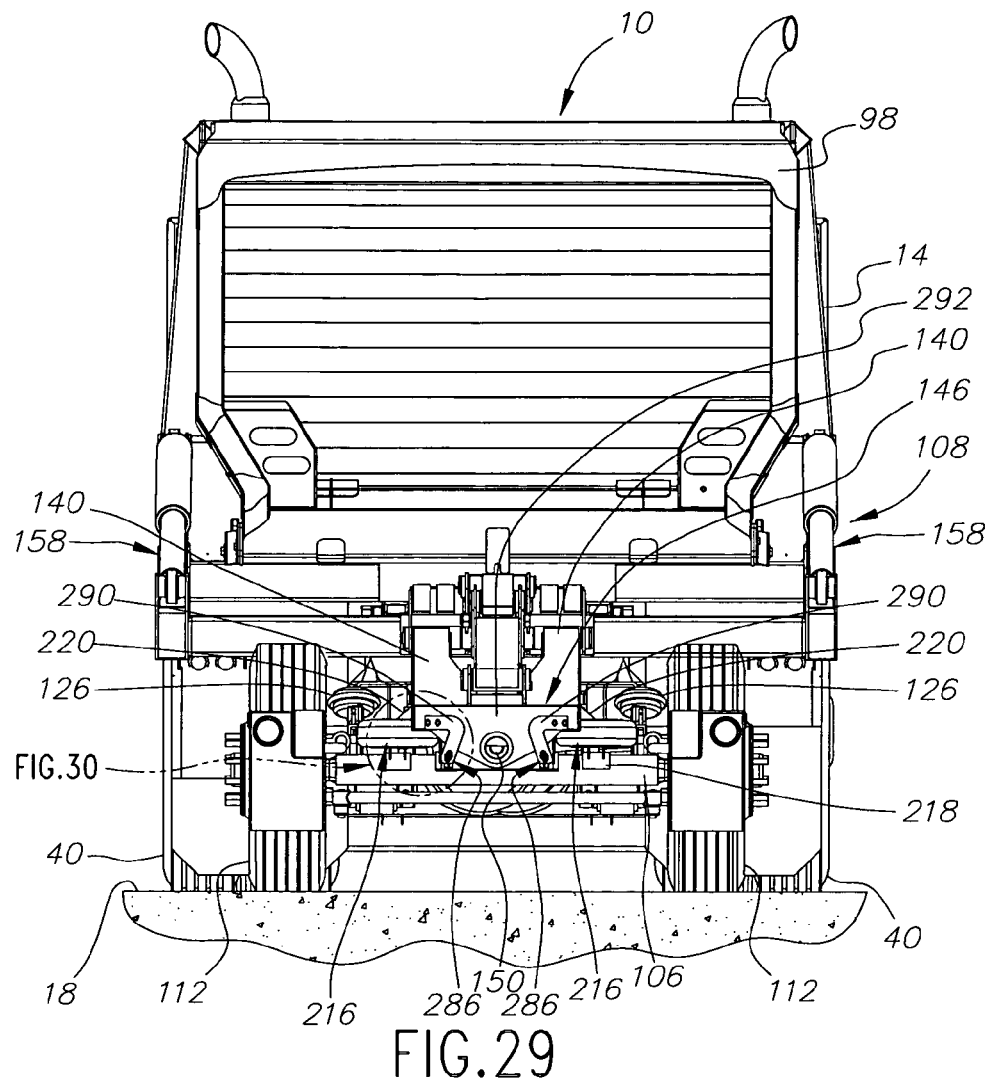
FIG. 29 is a rear view of the truck with the tag axle in its active condition and in a normal level attitude and with the coil spring/shock absorber assemblies for the tag axle wheels omitted.
Figure 30:
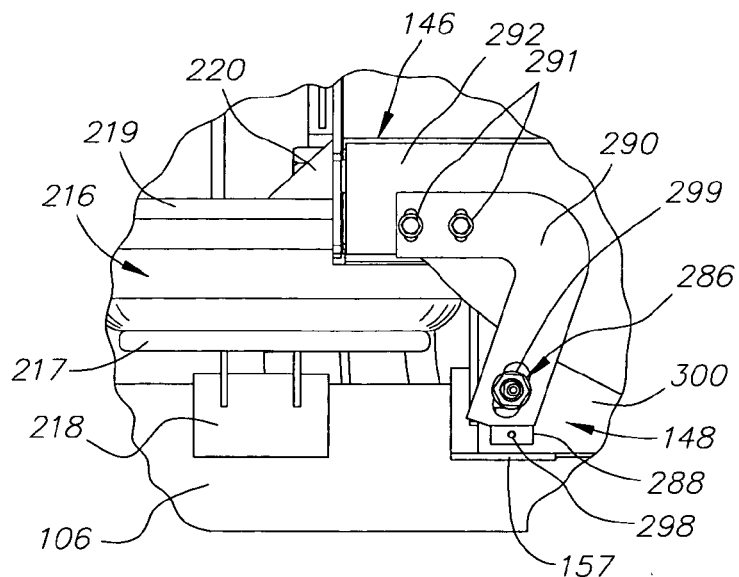
FIG. 30 is an enlarged view of the encircled portion in FIG. 29 labeled "FIG. 30"
Figure 31:
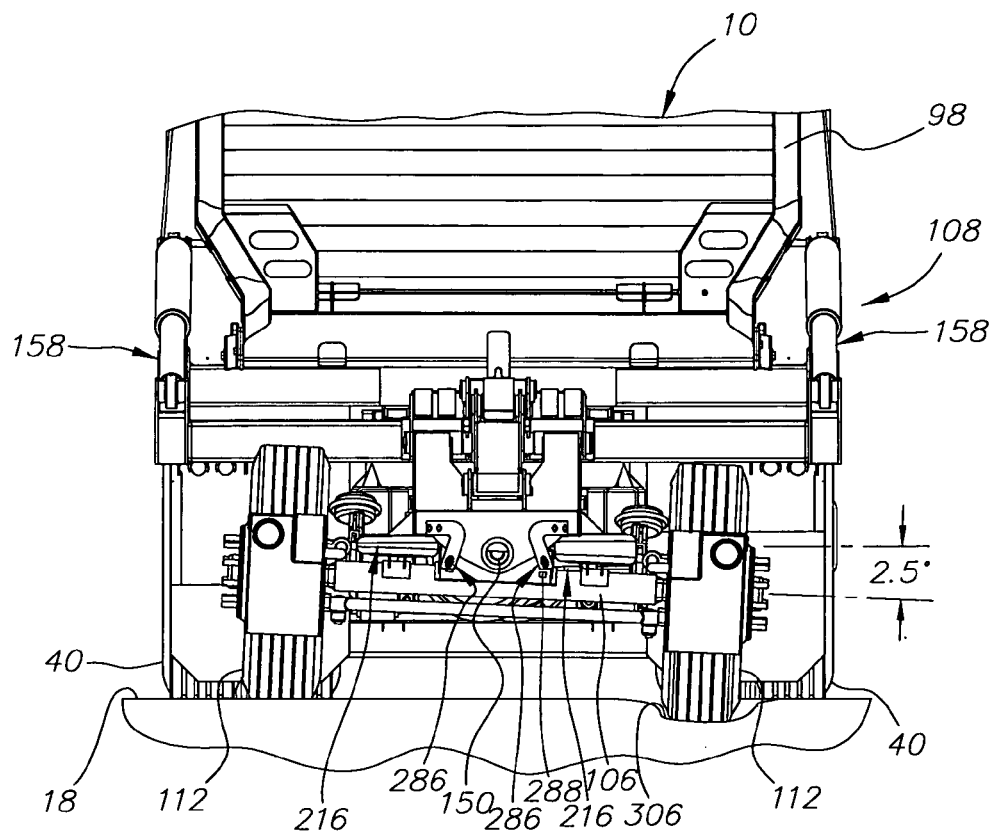
FIG. 31 is a partial rear view of the truck showing one of the tag axle wheels encountering a depression in a road and the tag axle resultantly tilted and with the coil spring/shock absorber assemblies for the tag axle wheels omitted.
Figure 32:
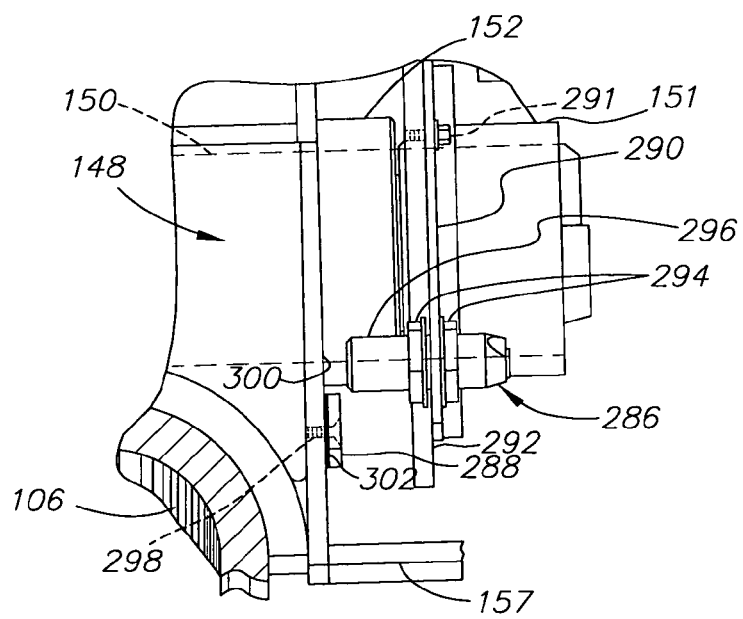
FIG. 32 is a view like FIG. 28 but of lesser extent and with the tag axle tilted as shown in FIG. 31.

Describing now the operation of the proximity switches 286, their switch contacts are normally closed with the tag axle 106 in its normal level or horizontal attitude as shown in FIGS. 28-30 and remain closed when one of the tag axle wheels 110 (in the illustrated example the right-side wheel) encounters a depression 306 such as a recess or pothole with a depth less than 2.3-inches deep and for example only about 1.7-inches deep resulting in a tag axle tilt angle of less than 3.5-inches and in this example 2.5-degrees from being level or horizontal as shown in FIGS. 31 and 32. And the proximity switches 286 also remain closed in like manner when one of the tag axle wheels 110 encounters a bump in a road less than 2.3-inches high causing the tag axle to tilt less than 3.5-degrees.

Figure 33:
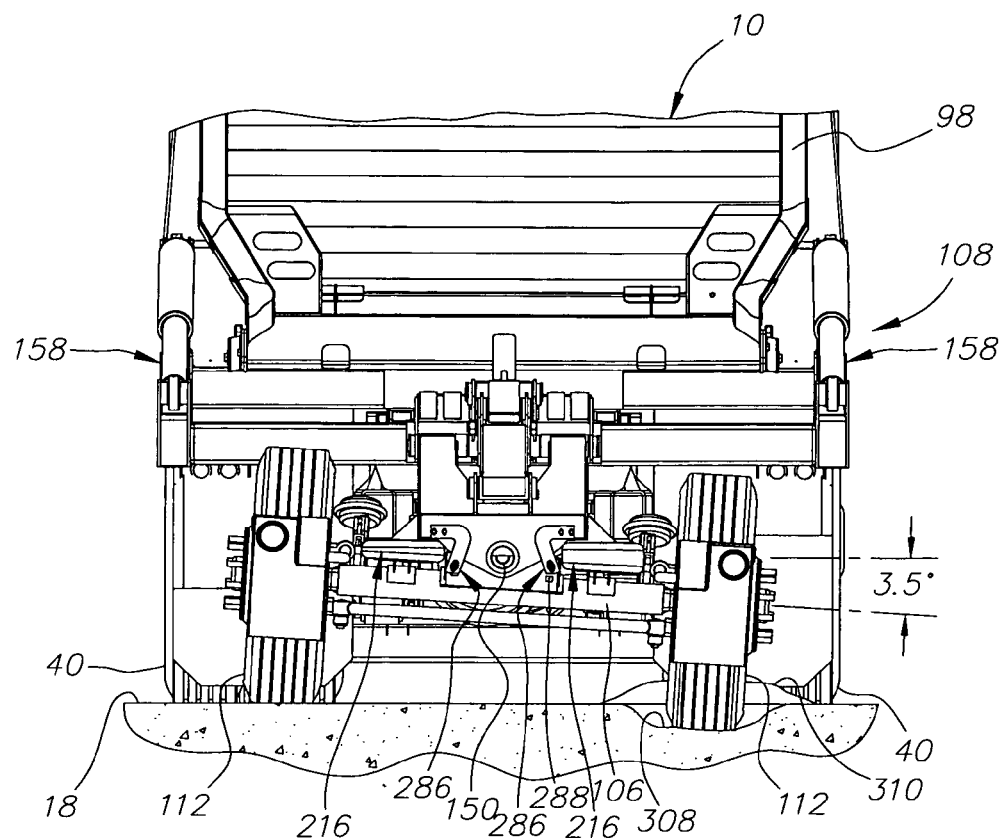
FIG. 33 is a view like FIG. 31 but showing the same tag axle wheel encountering a deeper road depression and the tag axle resultantly tilted to a greater degree.
Figure 34:
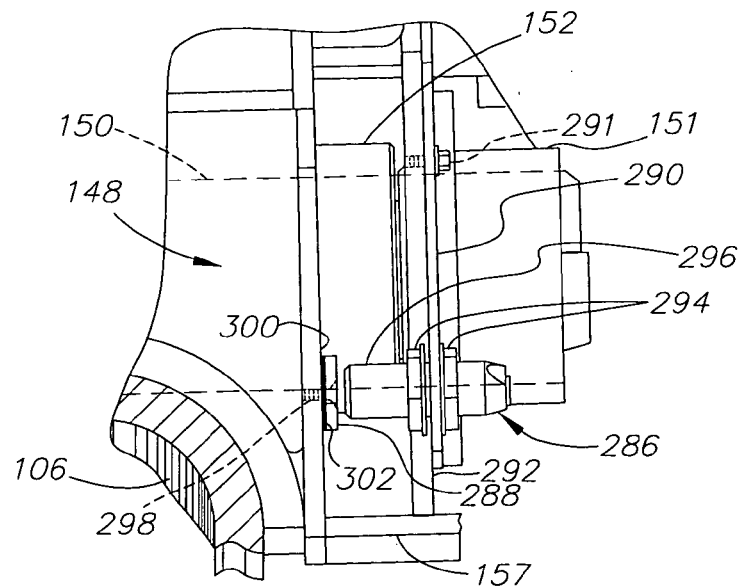
FIG. 34 is a view like FIG. 28 but of lesser extent and with the tag axle tilted as shown in FIG. 33.

But when one of the tag axle wheels 110 (in the illustrated example the right-side wheel) encounters a deeper recess 308 that is 2.3-inches deep that causes the tag axle to tilt 3.5-degrees as shown in FIGS. 33 and 34 or is deeper, the contacts in the proximity switch 286 on the opposite wheel side are then opened by the associated magnet 288 whereby the tag axle 106 is then relieved of pressured down force and the tag axle service brakes 114 are disabled as earlier described. And wherein after the affected tag axle wheel 110 is past such an encounter, the tag axle 106 is returned by the tag axle gas springs 216 to its normal level attitude and the opened proximity switch is restored to its normal closed condition to reestablish the tag axle 106 in its normal active condition with the tag axle fully pressured down and the tag axle service brakes 114 enabled. And similarly, the pressured down force on the tag axle 106 is relieved and the tag axle service brakes 114 are disabled by the opening of one of the proximity switches 286 when one of tag axle wheels 110 encounters a bump in a road causing the tag axle to tilt 3.5-degrees or more. Such as the bump 310 shown in the distance in FIG. 33 just ahead of the right-side wheel 110 whose height is the same or greater than the depth of the recess 308 and would cause tilting of the tag axle in the opposite direction and thus opening of the right-side proximity switch 286 to effect relief of the pressured down force on the tag axle and disabling of the tag axle wheel service brakes. And again with the tag axle active condition restored and the tag axle wheel service brakes enabled after the affected tag axle wheel is past such a bump. And whereby in either the case of a deep recess or pothole or a high bump, shock loading at the affected tag axle wheel is isolated from the truck frame with the relief of the pressured down force on the tag axle.

However, it will be appreciated that such relief of the pressured down force on the tag axle and the disabling of the tag axle brakes is dependent on the response time of the operating system and is therefore dependent on the speed of the truck and the extent of the recess or pothole or bump in the path of the affected tag axle wheel. For example, a tag axle wheel encounter with either a deep recess or pothole or a high bump causing the tag axle to tilt 3.5-degrees or more can be so brief that there is not sufficient time for the operating system to effect the relief of the down force on the tag axle and the disabling of the tag axle brakes. Whereby the normal operation of the tag axle and tag axle brakes is then not interrupted but which works to advantage in not having to restore the tag axle and tag axle brakes to normal operation as result of such a brief encounter and in thereby allowing for example the added braking by the tag axle brakes to remain available in an also suddenly occurring vehicle braking situation.

Furthermore, in the event that either one of the tag axle gas springs 216 or either one of the tag axle tires 112 is no longer able to perform its intended function and as a result allows the tag axle 106 to tilt or swing 3.5-degrees or more, one of the proximity switches 286 will similarly be opened to effect the relieving of the pressured down force on the tag axle and the disabling of the tag axle wheel service brakes by the opening of the Up Valves 236 and 238 and the closing of the Tag Axle Brake Valve 132. And under such circumstances, the relief or release of the pressured down force on the tag axle and the disabling of the tag axle service brakes remain while the tag axle continues to trail the truck but at a tilted angle of 3.5-degrees or more and with the tag axle tires 112 still engaging the road but not pressured down by the tag axle suspension system and then only supporting the dead weight of the tag axle assembly.

Figure 35:
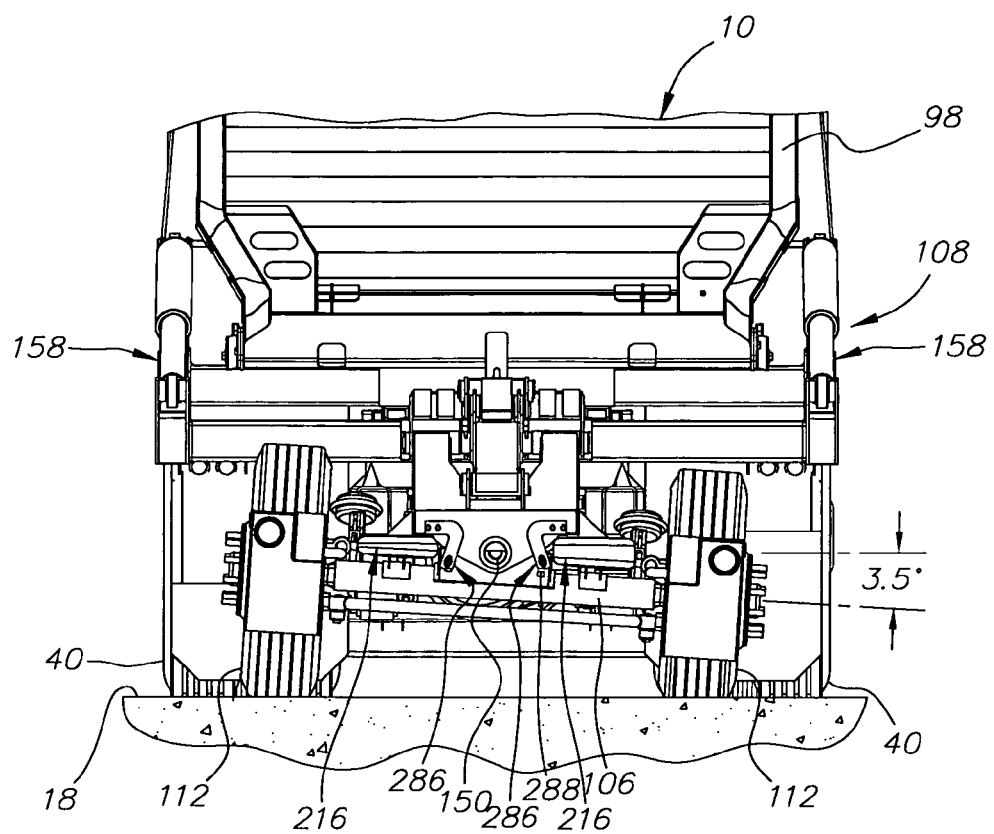
FIG. 35 is a partial rear view of the truck showing one of the tag axle gas springs collapsed and the tag axle resultantly tilted and with the coil spring/shock absorber assemblies for the tag axle wheels omitted.
Figure 36:
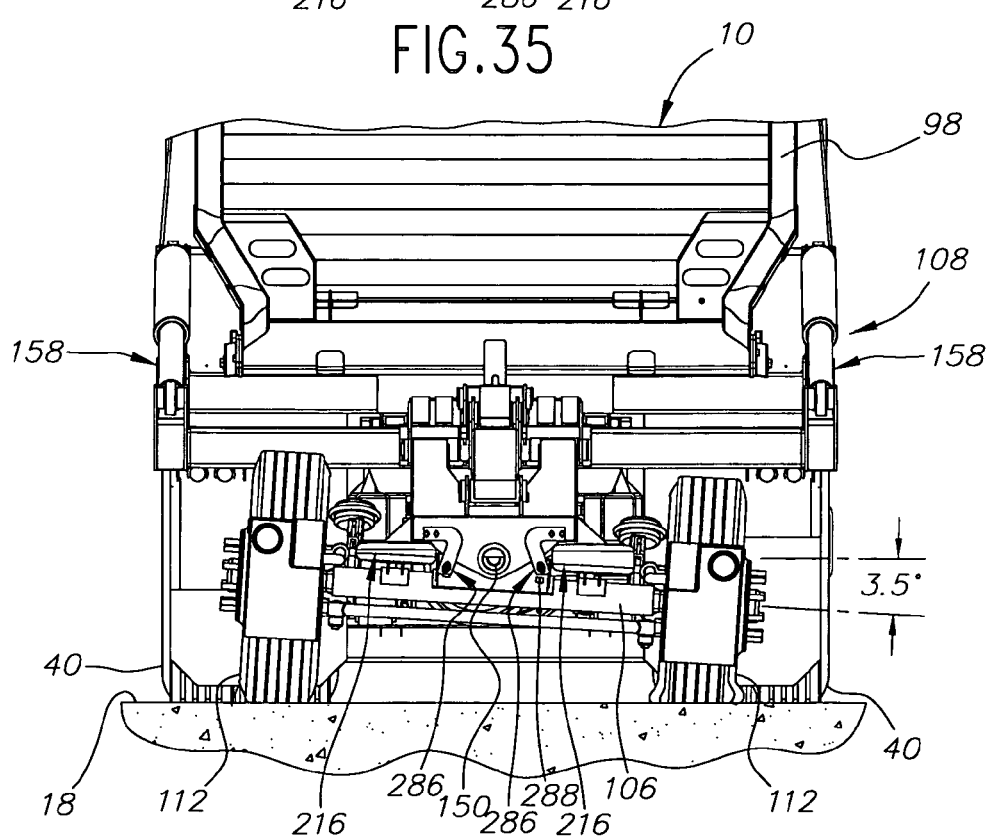
FIG. 36 is a partial rear view of the truck showing one of the tag axle tires deflated and the tag axle resultantly tilted and with the coil spring/shock absorber assemblies for the tag axle wheels omitted.

For example, this can occur when one of the tag axle gas springs 216 collapses as shown in FIG. 35 and when one of the tag axle tires 112 deflates as shown in FIG. 36. But in these circumstances, the relief of the pressured down force on the tag axle and the disabling of the tag axle service brakes remain unlike in passing over a severe depression or bump as earlier described. In which case, the truck operator can leave the tag axle deployed with the tag axle service brakes disabled for traveling to a service site with the tires still engaging the road but not pressured down by the tag axle suspension system 108 and then only supporting the dead weight of the tax axle assembly. Or the operator can raise the tag axle to its stored inactive condition for traveling to a service site.

In the case of one of the tag axle gas springs 216 collapsing (for example the left-side tag axle gas spring as shown in FIG. 35) and wherein such collapse allows the tag axle 106 to tilt 3.5-degrees as shown or more and which translates to 2.3-inches upward movement or more at the left-side wheel and the same amount but downward at the right-side wheel, the pressured down force on the tag axle 106 is relieved and the tag axle service brakes 114 are disabled with the resulting opening of the proximity switch 286 on the side opposite the collapsed tag axle gas spring. But unlike an encounter with a severe bump or depression that would only temporarily open one of the proximity switches as previously described, the tag axle remains excessively tilted with the one collapsed gas spring 216 but without the pressured down force while the tires 112 of the tag axle wheels 110 remain in contact with the road but now only carrying or supporting the dead weight of the tag axle assembly and with the tag axle stabilized at this angle by the other gas spring 216. And with the disabling of the tag axle service brakes 114 then preventing any braking being applied to the tag axle wheels 110 while one of the tag axle gas springs is collapsed.

In the case of one of the tag axle tires 112 deflating (for example the right-side tag axle tire as shown in FIG. 36) allowing the tag axle 106 to tilt 3.5-degrees as shown or more, the pressured down force on the tag axle 106 is relieved and the tag axle wheel service brakes 114 are disabled with the opening of the proximity switch 286 on the side opposite the deflated tire. And in this case, the tag axle gas spring 216 on the side opposite the deflated tire on release of the pressured down force on the tag axle acts to limit the tag axle tilt angle such that the tag axle wheel with the deflated tire is prevented from contacting the road and thereby being damaged while the truck continues to be driven but then with the tag axle only supporting the dead weight of the tag axle assembly. And wherein the gas springs 216 so perform by limiting the tag axle tilt angle to trip the proximity switches to an extent sufficiently less than the radial dimension of the tag axle tires outward their wheel and which in the exemplary embodiment is effected by the proximity switches being tripped at the 3.5-degrees tag axle tilt angle. And wherein with both the release of the pressured down force on the tag axle and disabling of the tag axle brakes, the deflated tire is not subjected to other than the dead weight of the tag axle assembly and could otherwise be significantly damaged if required to run flat with more than this dead weight and could be damaged even with this dead weight if its wheel was braked.

Moreover, should power be lost to the relay 294 because of damage to the Tag Axle Tilt Angle Sensors or their wiring, the tag axle will be relieved of the pressured down force and the tag axle service brakes disabled. Thus allowing the vehicle operator to drive the truck to a service site with the tag axle remaining deployed but no longer having to help support the truck frame. Or the vehicle operator can establish the tag axle in its stored inactive condition for travel to a service site under such circumstances.

Thus it will be appreciated that the tag axle suspension system including the primary and secondary tag axle suspension provides significant advantages, the relieving of the pressured down force on the tag axle under certain circumstances provides significant advantages, the disabling of the tag axle service brakes under certain circumstances provides significant advantages, and the tag axle operating system provides significant advantages in how it operates to effect the tag axle force relief and the tag axle brake enabling and disabling. And in the above exemplary embodiment, all their features are combined to provide all their advantages. But they also have the attributes of being separable and distinct as well as being suitable to other types of payload-carrying motor vehicles employing a tag axle.

Figure 37:
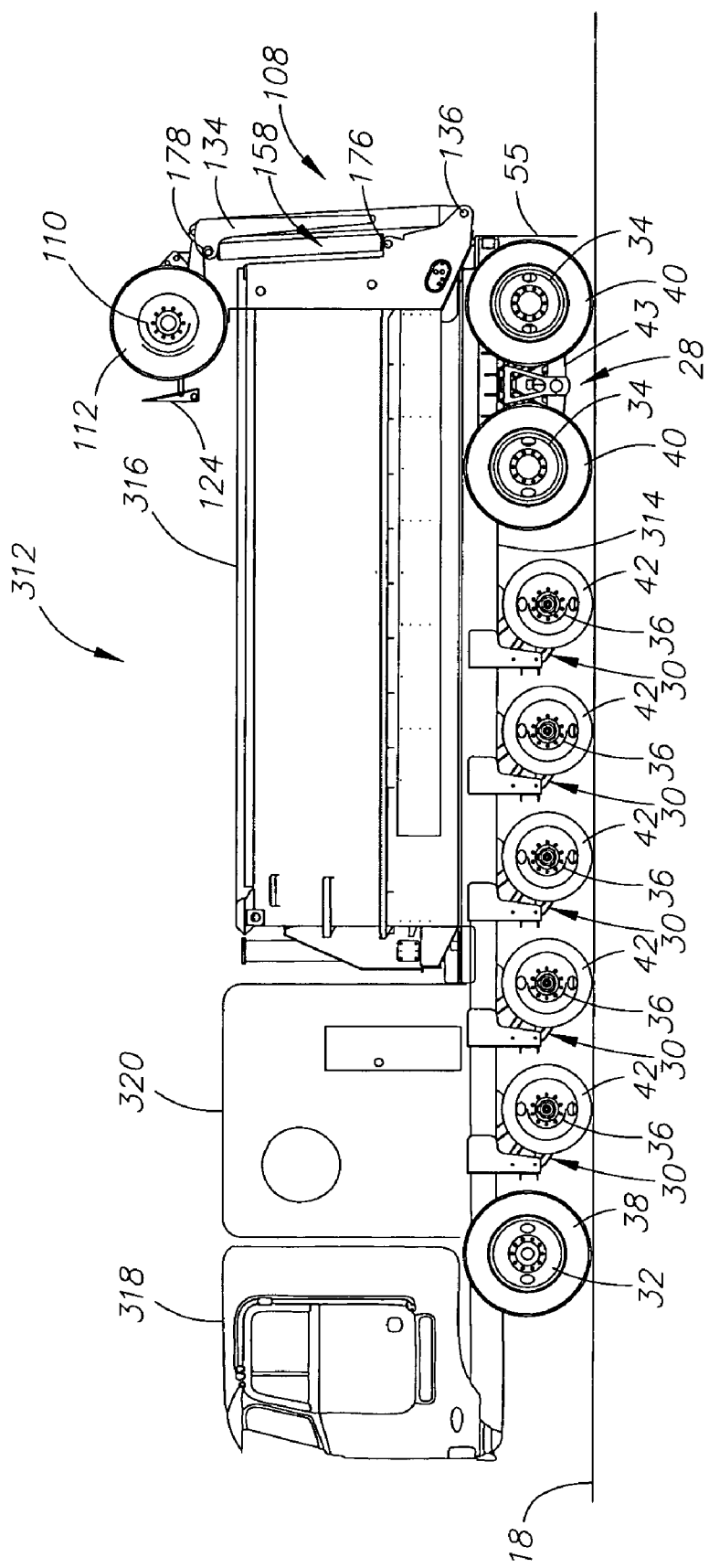
FIG. 37 is a side view of another embodiment of a dump truck according to the present invention.

Another embodiment of the present invention is shown in FIG. 37 and comprises a dump truck 312 like that in the previous embodiment but having a longer frame 314, a longer truck body 316, a cab 318 that overhangs the steer axle 20, and two additional pusher axles 24 having wheels 36 with tires 42 and service brakes, and suspension systems 30. And wherein a service/storage compartment 320 now houses the engine, transmission and fuel tanks that are positioned between the cab 318 and truck body 316 and wherein the fuel tanks are mounted inboard below the frame. And wherein the number of pusher axles now totals five which is the maximum number possible allowed by the space available between the steer axle tires 38 and the forward most drive axle tires 40 in this significantly stretched truck frame and truck body arrangement.

It will also be appreciated that having disclosed exemplary embodiments of the invention, persons skilled in this art may arrive at various versions or modified forms of the invention constituting other embodiments and as adapted to other types of payload-carrying motor vehicles with or without a tailgate. And wherein for example other types of tilt angle sensors for the tag axle may be employed such as for example other types of suitable proximity switches and other kinds of suitable motion sensors. And within the prescription of preventing tag axle wheel contact with a road surface in the event of a tag axle tire going flat, the allowed tilt angle may for example be increased within the available stroke of the gas springs beyond that in the exemplary embodiments in order to allow larger tag axle wheel amplitude without relieving the force on the tag axle and disabling the tag axle brakes. With such larger accompanying tag axle wheel amplitude without tag axle force relief and brake disabling accomplished by simply adjusting the positions of the tag axle tilt sensors relative to their magnets in the case of magnetically operated proximity switches as employed in the exemplary embodiments. And therefore the scope of the invention is intended to be limited only by the scope of the appended claims.

The invention claimed is:

1. A payload-carrying motor vehicle comprising a steer axle, at least one drive axle, a tag axle, all of said axles having wheels with tires and air brakes, a tag axle suspension system adapted to suspend the tag axle in an active condition wherein the tag axle is pivotal about a first axis parallel to the other axles and also about a second axis located equidistant from the tag axle wheels and laying in a plane at right angles to the first axis and wherein the tag axle is forced to urge the tag axle tires to bear against a road surface and accept a predetermined load, an air brake system adapted to operate the air brakes of all the wheels, and a tag axle operating system adapted to establish the tag axle in the active condition while enabling operation of the air brakes of the tag axle wheels and to disable operation of the air brakes of the tag axle wheels when the tag axle pivots about the second axis and reaches a predetermined tilt angle in maintaining contact of the tag axle tires with a road surface.

2. A payload-carrying motor vehicle as set forth in claim 1 wherein said tag axle operating system includes tilt sensors adapted to sense the angle of the tag axle and by operation of one of the sensors effect the disabling of the air brakes of the tag axle wheels when the tag axle reaches the predetermined tilt angle.

3. A payload-carrying motor vehicle as set forth in claim 1 wherein said tag axle operating system includes tilt sensors located on opposite sides of said second axis adapted to sense the angle of the tag axle and by operation of one of the sensors effect the disabling of the air brakes of the tag axle wheels when the tag axle reaches the predetermined tilt angle.

4. A payload-carrying motor vehicle as set forth in claim 1 wherein said tag axle operating system includes proximity switches located on opposite sides of said second axis adapted to sense the angle of the tag axle and by operation of one of the switches effect the disabling of the air brakes of the tag axle wheels when the tag axle reaches the predetermined tilt angle.

5. A payload-carrying motor vehicle as set forth in claim 1 wherein said tag axle operating system includes magnetically operated proximity switches located on opposite sides of said second axis adapted to sense the angle of the tag axle and by operation of one of the switches effect the disabling of the air brakes of the tag axle wheels when the tag axle reaches the predetermined tilt angle.

6. A payload-carrying motor vehicle as set forth in claim 1 wherein said tag axle operating system includes magnetically operated proximity switches located on opposite sides of said second axis and arranged so that one of the switches is adapted to sense the angle of the tag axle and effect the disabling of the air brakes of the tag axle wheels when the tag axle reaches the predetermined tilt angle on pivoting of the tag axle in the one direction about the second axis and the other switch is adapted is adapted to sense the angle of the tag axle and effect the disabling of the brakes of the tag axle wheels when the tag axle reaches the predetermined tilt angle on pivoting about the second axis in an opposite direction.

7. A payload-carrying motor vehicle as set forth in claim 6 wherein said switches are normally closed to enable operation of the air brakes of the tag axle wheels when the tag axle is in said active condition and wherein one of the switches is opened to effect the disabling of the air brakes of the tag axle wheels when the tag axle on pivotal movement in the one direction reaches the predetermined tilt angle and the other switch is opened to effect the disabling of the air brakes of the tag axle wheels when the tag axle on pivotal movement in the opposite direction reaches the predetermined tilt angle.

8. A payload-carrying motor vehicle as set forth in claim 7 wherein said switches are stationary with respect to the tag axle and are operated by magnets mounted on the tag axle.

9. A payload-carrying motor vehicle as set forth in claim 8 wherein said tag axle has a trunnion body pivotally supported on a carriage, said proximity switches are mounted on said carriage, said magnets have a rectangular shape and are each fastened with a single fastener to the trunnion body, and a cushion sandwiched between each said magnet and said trunnion body adapted to prevent fracture of the associated magnet during tightening of the associated fastener and also maintain the associated magnet length-wise across the path of movement of the associated switch.

10. A payload-carrying motor vehicle as set forth in claim 1 further comprising a second drive axle having wheels with tires and air brakes, at least one pusher axle located between the steer axle and drive axles, said pusher axle having wheels with tires and air brakes, and said air brake system also adapted to operate the air brakes of the pusher axle wheels and the second drive axle wheels.

11. A payload-carrying motor vehicle as set forth in claim 1 further comprising a second drive axle having wheels with tires and air brakes, a plurality of pusher axles located between the steer axle and drive axles, said pusher axles each having wheels with tires and air brakes, and said air brake system also adapted to operate the air brakes of the second drive axle wheels and all of the pusher axle wheels.

* * * * *